US011122315B2

(12) United States Patent
Green et al.

(10) Patent No.: US 11,122,315 B2
(45) Date of Patent: Sep. 14, 2021

(54) SYSTEMS AND METHODS TO IDENTIFY VIDEO CONTENT TYPES

(71) Applicant: WIDEORBIT LLC, San Francisco, CA (US)

(72) Inventors: Robert D. Green, Seattle, WA (US); John W. Morris, Washougal, WA (US); James M. Kott, Kirkland, WA (US); Brian S. Bosworth, Edgewater, MD (US)

(73) Assignee: WideOrbit LLC, San Francisco, CA (US)

( * ) Notice: Subject to any disclaimer, the term of this patent is extended or adjusted under 35 U.S.C. 154(b) by 0 days.

(21) Appl. No.: 14/679,755

(22) Filed: Apr. 6, 2015

(65) Prior Publication Data
US 2015/0334434 A1 Nov. 19, 2015

Related U.S. Application Data

(60) Provisional application No. 61/992,662, filed on May 13, 2014.

(51) Int. Cl.
*H04N 7/10* (2006.01)
*H04N 7/025* (2006.01)
(Continued)

(52) U.S. Cl.
CPC ....... *H04N 21/2668* (2013.01); *H04N 21/222* (2013.01); *H04N 21/231* (2013.01);
(Continued)

(58) Field of Classification Search
CPC ............ H04N 21/812; H04N 21/4622; H04N 21/2668; H04N 21/23424; H04N 7/17318;
(Continued)

(56) References Cited

U.S. PATENT DOCUMENTS 5,351,135 A * 9/1994 Saeger ................... H04N 3/223
348/435.1
6,487,721 B1 11/2002 Safadi
(Continued)

FOREIGN PATENT DOCUMENTS

WO 2007/056532 A1 5/2007
WO 2010/112072 A1 10/2010
(Continued)

OTHER PUBLICATIONS

Green et al., "Content Management and Provisioning System," U.S. Appl. No. 62/172,693, filed Jun. 8, 2015, 43 pages.
(Continued)

*Primary Examiner* — Mulugeta Mengesha
(74) *Attorney, Agent, or Firm* — Seed IP Law Group LLP

(57) ABSTRACT

Mediacast video content detection systems and methods that analyze the image content data of mediacast source data flows that include a variety of replaceable video content segments and a variety of non-replaceable video content segments to detect one or more characteristics of the video content segments. Detection regions may be utilized to detect visual elements in the video content segments that provide information regarding one or more properties of the video content segments, such as program type, start times, end times, video content provider, title, and the like. Replacement video content segments may replace video content segments determined to be replaceable. A buffering scheme may be employed to inherently adjust asynchronicity between a broadcast or Webcast and a mediacast. Actual insertion of replacement video content segments may occur upstream of a content consumer device or at the content consumer device.

21 Claims, 11 Drawing Sheets

(51) Int. Cl.
| | |
|---|---|
| *H04N 21/2668* | (2011.01) |
| *H04N 21/2665* | (2011.01) |
| *H04N 21/231* | (2011.01) |
| *H04N 21/234* | (2011.01) |
| *H04N 21/462* | (2011.01) |
| *H04N 21/2343* | (2011.01) |
| *H04N 21/235* | (2011.01) |
| *H04N 21/81* | (2011.01) |
| *H04N 21/222* | (2011.01) |
| *H04N 21/84* | (2011.01) |
| *H04N 21/61* | (2011.01) |

(52) U.S. Cl.
CPC ..... *H04N 21/235* (2013.01); *H04N 21/23418* (2013.01); *H04N 21/23424* (2013.01); *H04N 21/23439* (2013.01); *H04N 21/2665* (2013.01); *H04N 21/4622* (2013.01); *H04N 21/6125* (2013.01); *H04N 21/812* (2013.01); *H04N 21/84* (2013.01)

(58) Field of Classification Search
CPC ............... H04N 21/222; H04N 21/231; H04N 21/23418; H04N 21/23439; H04N 21/235; H04N 21/2665; H04N 21/6125; H04N 21/84
See application file for complete search history.

(56) References Cited

U.S. PATENT DOCUMENTS

| | | | |
|---|---|---|---|
| 6,577,716 B1 | 6/2003 | Minter et al. | |
| 7,412,714 B2 | 8/2008 | Kitayama | |
| 7,676,405 B2 | 3/2010 | Steelberg et al. | |
| 7,747,769 B1 | 7/2010 | Kearns et al. | |
| 7,752,642 B2 | 7/2010 | Lemmons | |
| 7,925,774 B2 | 4/2011 | Zhang et al. | |
| 7,979,877 B2 | 7/2011 | Huber et al. | |
| 8,230,037 B2 | 7/2012 | Story et al. | |
| 8,381,244 B2* | 2/2013 | King | H04H 20/103 705/14.4 |
| 8,387,102 B1 | 2/2013 | Roberts et al. | |
| 8,700,792 B2 | 4/2014 | Hughes et al. | |
| 8,812,637 B2 | 8/2014 | Cragun et al. | |
| 8,819,754 B2 | 8/2014 | Virdi et al. | |
| 8,893,208 B2 | 11/2014 | Ma et al. | |
| 8,898,717 B1 | 11/2014 | Labrozzi et al. | |
| 8,984,094 B2* | 3/2015 | Green | H04L 67/06 705/14.4 |
| 9,032,456 B2 | 5/2015 | Pierson et al. | |
| 2001/0023498 A1 | 9/2001 | Cosmao et al. | |
| 2002/0078443 A1 | 6/2002 | Gadkari et al. | |
| 2003/0028873 A1* | 2/2003 | Lemmons | H04N 7/17318 725/36 |
| 2003/0033157 A1 | 2/2003 | Dempski et al. | |
| 2003/0037068 A1 | 2/2003 | Thomas et al. | |
| 2003/0188320 A1 | 10/2003 | Shing | |
| 2004/0025176 A1 | 2/2004 | Franklin et al. | |
| 2004/0073916 A1* | 4/2004 | Petrovic | H04H 20/14 725/18 |
| 2004/0088726 A1 | 5/2004 | Ma et al. | |
| 2004/0128682 A1 | 7/2004 | Liga et al. | |
| 2004/0133467 A1 | 7/2004 | Siler | |
| 2007/0074243 A1 | 3/2007 | Verhaegh et al. | |
| 2007/0157228 A1* | 7/2007 | Bayer | G06Q 30/02 725/34 |
| 2007/0220411 A1 | 9/2007 | Hauser | |
| 2008/0120638 A1 | 5/2008 | King et al. | |
| 2008/0195938 A1* | 8/2008 | Tischer | H04N 7/165 715/255 |
| 2009/0031037 A1 | 1/2009 | Mendell et al. | |
| 2009/0060458 A1 | 3/2009 | Bauchot et al. | |
| 2010/0223314 A1 | 9/2010 | Gadel et al. | |
| 2010/0269138 A1 | 10/2010 | Krikorian et al. | |
| 2010/0280889 A1 | 11/2010 | Gabriel et al. | |
| 2010/0293046 A1 | 11/2010 | Cooke et al. | |
| 2011/0145370 A1 | 7/2011 | Nieuwenhuys | |
| 2012/0096486 A1 | 4/2012 | Stallard et al. | |
| 2012/0116883 A1* | 5/2012 | Asam | G06Q 30/0251 705/14.58 |
| 2012/0184202 A1 | 7/2012 | Gadoury | |
| 2012/0192222 A1 | 7/2012 | Kumar et al. | |
| 2013/0031582 A1* | 1/2013 | Tinsman | H04N 21/2353 725/36 |
| 2013/0132997 A1 | 5/2013 | King et al. | |
| 2013/0144723 A1 | 6/2013 | Green et al. | |
| 2013/0198328 A1 | 8/2013 | Green et al. | |
| 2013/0246567 A1 | 9/2013 | Green et al. | |
| 2013/0282495 A1 | 10/2013 | Gilbane et al. | |
| 2014/0068648 A1 | 3/2014 | Green et al. | |
| 2014/0109136 A1 | 4/2014 | Evans et al. | |
| 2014/0149596 A1 | 5/2014 | Emerson, III | |
| 2014/0150019 A1 | 5/2014 | Ma et al. | |
| 2014/0223475 A1 | 8/2014 | Mcintire et al. | |
| 2014/0280746 A1 | 9/2014 | Johns | |
| 2014/0325030 A1 | 10/2014 | Maharajh et al. | |
| 2015/0067722 A1 | 3/2015 | Bjordammen et al. | |
| 2015/0074732 A1 | 3/2015 | Green et al. | |
| 2016/0212455 A1* | 7/2016 | Manna | G06Q 30/02 |
| 2017/0353751 A1 | 12/2017 | Green et al. | |

FOREIGN PATENT DOCUMENTS

| | | |
|---|---|---|
| WO | 2014/004955 A1 | 1/2014 |
| WO | 2014/107807 A1 | 7/2014 |
| WO | 2015/175121 A1 | 11/2015 |

OTHER PUBLICATIONS

Green et al., "Systems, Methods and Articles to Automatically Expose and Place Material in Streams of Programming," Amendment filed Jun. 25, 2015, for U.S. Appl. No. 13/679,828, 23 pages.

Green et al., "Systems and Methods to Deliver a Personalized Mediacast," U.S. Appl. No. 61/611,403, filed Mar. 15, 2012, 75 pages.

Green et al., "Systems and Methods to Deliver a Personalized Mediacast," Notice of Allowance dated Nov. 6, 2014, for U.S. Appl. No. 13/711,984, 22 pages.

Green et al., "Systems and Methods to Deliver a Personalized Mediacast With an Uninterrupted Lead-In Portion," U.S. Appl. No. 61/877,182, filed Sep. 12, 2013, 171 pages.

Green et al., "Systems and Methods to Deliver a Personalized Mediacast With an Uninterrupted Lead-In Portion," U.S. Appl. No. 14/485,416, filed Sep. 12, 2014, 171 pages.

Green et al., "Systems and Methods to Delver a Personalized Mediacast With an Uninterrupted Lead-In Portion," Preliminary Amendment filed Sep. 15, 2014, for U.S. Appl. No. 14/485,416, 13 pages.

Green et al., "Systems and Methods to Identify Video Content Types," U.S. Appl. No. 61/992,662, filed May 13, 2014, 100 pages.

Green et al., "Systems, Methods and Articles to Automatically Expose and Place Material in Streams of Programming," U.S. Appl. No. 61/561,186, filed Nov. 17, 2011, 70 pages.

Green et al., "Systems, Methods and Articles to Automatically Expose and Place Material in Streams of Programming," Office Action dated May 14, 2014, for U.S. Appl. No. 13/679,828, 49 pages.

Green et al., "Systems, Methods and Articles to Automatically Expose and Place Material in Streams of Programming," Amendment filed Oct. 13, 2014, for U.S. Appl. No. 13/679,828, 20 pages.

Green et al., "Systems, Methods and Articles to Automatically Expose and Place Material in Streams of Programming," Office Action dated Jan. 28, 2015, for U.S. Appl. No. 13/679,828, 55 pages.

Green et al., "Systems, Methods and Articles to Provide Content in Networked Environment," U.S. Appl. No. 61/587,475, filed Jan. 17, 2012, 98 pages.

(56) References Cited

OTHER PUBLICATIONS

Green et al., "Systems, Methods and Articles to Provide Content in Networked Environment," U.S. Appl. No. 61/677,968, filed Jul. 31, 2012, 84 pages.
Green et al., "Systems, Methods and Articles to Provide Content in Networked Environment," Office Action dated Apr. 11, 2014, for U.S. Appl. No. 13/956,020, 13 pages.
Green et al., "Systems, Methods and Articles to Provide Content in Networked Environment," Amendment filed Sep. 11, 2014, for U.S. Appl. No. 13/956,020, 15 pages.
Green et al., "Systems, Methods and Articles to Provide Content in Networked Environment," Office Action dated Oct. 7, 2014, for U.S. Appl. No. 13/956,020, 15 pages.
International Search Report and Written Opinion dated Jun. 29, 2015, for corresponding International Application No. PCT/US2015/025279, 15 pages.
King et al., "Content Injection System and Methodology," Amendment filed Jan. 7, 2011, for U.S. Appl. No. 11/985,143, 11 pages.
King et al., "Content Injection System and Methodology," Amendment filed May 27, 2011, for U.S. Appl. No. 11/985,143, 21 pages.
King et al., "Content Injection System and Methodology," Amendment filed Jul. 6, 2012, for U.S. Appl. No. 11/985,143, 25 pages.
King et al., "Content Injection System and Methodology," Notice of Allowance dated Oct. 15, 2012, for U.S. Appl. No. 11/985,143, 16 pages.
King et al., "Content Injection System and Methodology," Office Action dated Jul. 7, 2010, for U.S. Appl. No. 11/985,143, 12 pages.
King et al., "Content Injection System and Methodology," Office Action dated Mar. 29, 2011, for U.S. Appl. No. 11/985,143, 15 pages.
King et al., "Content Injection System and Methodology," Office Action dated Feb. 21, 2012, for U.S. Appl. No. 11/985,143, 14 pages.
King et al., "Content Injection System and Methodology," Office Action dated Feb. 25, 2015, for U.S. Appl. No. 13/744,129, 13 pages.
King et al., "Content Injection System and Methodology," Supplemental Response filed Jan. 20, 2011, for U.S. Appl. No. 11/985,143, 13 pages.
King et al., "Content Injection System and Methodology, " U.S. Appl. No. 60/860,573, filed Nov. 21, 2006, 7 pages.
Hacker, "MP3: The Definite Guide," Sebastopol, CA, O'Reilly & Associates, Inc., First Edition, Mar. 2000, 378 pages.
International Search Report and Written Opinion of the International Searching Authority, dated Aug. 10, 2015, for corresponding International Application No. PCT/US2014/068876, 9 pages.
"Alarm-Allocation," *Microsoft Computer Dictionary*, Fifth Edition, Microsoft Press, 2002, p. 23.
"Determinism," *Brittanica Concise Encyclopedia*, Encyclopedia Brittanica, 2006, p. 537, 6 pages.
Baum, "2: The Mind Is a Computer Program," *What is Thought?*, The MIT Press, 2004, pp. 33-65, 38 pages.
Finney et al., "Predicting Partial Paths from Planning Problem Parameters," *Robotics, Science and Systems III*, Burgard et al. (eds.), The MIT Press, 2008, pp. 41-48, 11 pages.

Green et al., "Systems and Methods to Deliver a Personalized Mediacast With an Uninterrupted Lead-In Portion," Office Action dated Sep. 30, 2016, for U.S. Appl. No. 14/485,416, 17 pages.
Green et al., "Systems, Methods and Articles to Automatically Expose and Place Material in Streams of Programming," Office Action dated Oct. 19, 2016, for U.S. Appl. No. 13/679,828, 18 pages.
International Preliminary Report on Patentability, dated Nov. 15, 2016, for corresponding International Application No. PCT/US2015/025279, 10 pages.
Krader, *Noetics: The Science of Thinking and Knowing*, Peter Lang Publishing, 2010, pp. 551-553, 5 pages.
Searle, *Mind—A Brief Introduction*, Oxford University Press, 2004, pp. 62-73, 16 pages.
Green et al., "Systems and Methods to Deliver a Personalized Mediacast With an Uninterrupted Lead-In Portion," Submission for RCE, filed Mar. 28, 2017, for U.S. Appl. No. 14/485,416, 15 pages.
Extended European Search Report, dated May 3, 2018, for European Application No. 14907546.7-1208, 9 pages.
Notice of Allowance, dated Apr. 19, 2017, for U.S. Appl. No. 14/485,416, Green et al., "Systems and Methods to Deliver a Personalized Mediacast With an Uninterrupted Lead-In Portion," 5 pages.
Office Action, dated Apr. 30, 2018, for U.S. Appl. No. 15/681,094, Green et al., "Systems and Methods to Deliver a Personalized Mediacast With an Uninterrupted Lead-In Portion," 20 pages.
Amendment, filed Jan. 17, 2013, for U.S. Appl. No. 13/744,129, King et al., "Content Injection System and Methodology," 11 pages.
Amendment, filed Jul. 24, 2015, for U.S. Appl. No. 13/744,129, King et al., "Content Injection System and Methodology," 22 pages.
Appellant's Brief, dated May 16, 2016, for U.S. Appl. No. 13/744,129, King et al., "Content Injection System and Methodology," 73 pages.
Appellant's Reply Brief, dated Nov. 4, 2016, for U.S. Appl. No. 13/744,129, King et al., "Content Injection System and Methodology," 10 pages.
Decision on Appeal, dated Jan. 22, 2018, for U.S. Appl. No. 13/744,129, King et al., "Content Injection System and Methodology," 10 pages.
Examiner's Answer to Appeal Brief, dated Sep. 7, 2016, for U.S. Appl. No. 13/744,129, King et al., "Content Injection System and Methodology," 14 pages.
Final Office Action, dated Sep. 8, 2015, for U.S. Appl. No. 13/744,129, King et al., "Content Injection System and Methodology," 19 pages.
Green et al., "Content Management and Provisioning System," U.S. Appl. No. 15/580,593, filed Dec. 7, 2017, 43 pages.
International Search Report and Written Opinion, dated Sep. 8, 2016, for International Application No. PCT/US2016/036190, 8 pages.
Notice of Allowance, dated Jan. 31, 2018, for U.S. Appl. No. 13/744,129, King et al., "Content Injection System and Methodology," 8 pages.
Notice of Panel Decision from Pre-Appeal Brief Review, dated Apr. 19, 2016, for U.S. Appl. No. 13/744,129, King et al., "Content Injection System and Methodology," 4 pages.
Pre-Appeal Brief Request for Review, dated Feb. 5, 2016, for U.S. Appl. No. 13/744,129, King et al., "Content Injection System and Methodology," 7 pages.

* cited by examiner

SYSTEMS AND METHODS TO IDENTIFY VIDEO CONTENT TYPES

BACKGROUND

Technical Field

This disclosure generally relates to the automated provision of video content to video content consumers in a networked environment in a modified form from content broadcast or Webcast by content providers.

Description of the Related Art

Content providers such as television stations and networks (collectively, "broadcasters"), and Webcasters provide programming including programming content segments (e.g., music, talk, news, sports, weather, etc.) and non-programming content segments (e.g., advertisements, legal notices, etc.). Content providers' delivery of content via traditional "over the air" or terrestrial broadcast is often supplemented with Webcasts. In some instances, the Webcasts may be transmitted substantially contemporaneous with the broadcast. While content providers may employ repeaters and the like, broadcasts are typically limited in range to a geographic region.

Programming, for example broadcast or Webcast programming (collectively "mediacast programming"), often includes non-programming content (e.g., advertisements) interspersed with the subject matter of the programming content which is the principal or main subject of the programming offered by the content provider. Programming content segments are often interspersed with non-programming content segments that are sometimes referred to as "ad breaks" since the non-programming content segments are often composed principally of paid advertising or public service announcements. Content providers typically sell advertising time to generate revenue to fund operation, as well as to generate profits where the content provider is a commercial entity rather than a nonprofit entity. Given that most broadcasts are local in nature or extent, broadcasters often carry advertisements and other material which is of a somewhat local or parochial interest. For example, a local chain may place advertisements with a local broadcaster since the audience targeted by the local chain is also often local and local advertising tends to be less expensive than regional or national advertising.

Often, content providers provide an alternative source of the programming, for example, providing a Webcast or even a podcast of the programming. The audience for the alternative source of programming may be significantly different from the audience for the broadcast. For example, the audience for the alternative source of programming may be more geographically diverse, or may be more comfortable with technologies such as streaming of content to personal computers or even smartphone devices. As such, the non-programming content interspersed in a broadcast or Webcast may not be particularly well suited, applicable or of interest to the audience of the alternative source of programming.

Content providers are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

It is not uncommon for content providers to purposely place some type of specialized marker or metadata within their produced content. Some of these markers are placed at locations that would occur right before the actual starting boundaries of content segments. This allows for content receivers and/or automated systems within the media cast chain to be informed about whichever content properties it needs immediately before it begins to be transmitted or rendered. Other forms of content property indicators utilize specially designed identifying techniques that are implemented within the transmission communication protocols or within the transmitter hardware itself.

Overall, these identifying markers are typically inserted by the content producer in a predetermined and automated way, such that redistributors or autonomous relayed networks may know if the upcoming content type allows for a chance to invoke their own automated event handlers, or inform automated systems of when certain content segments are allowed to be replaced. If for whatever reason the markers that are contained within the mediacast are unable to be received, it presents a challenging situation to receivers or rebroadcasters which are reliant on content type information to properly sequence their own mediacasting chain. For example, the ability to receive content identification markers may be hindered, or the markers may be unable to be received due to the inability to obtain the proper decoding and/or receiving hardware.

One of the main reasons that content type identifiers may be important to a rebroadcasting entity is that the content type identifiers contain specific information about which content segments the content producer allows to be replaced and which content segments the content producer requires to be transmitted. Without information about which content segments are replaceable, the rebroadcaster or distributor loses the ability to monetize that allotted content space with their own content segment inventory.

New approaches that automate the various activities related to providing requested content, customized or otherwise modified with or by the insertion of new or replacement materials, for instance, replacement programming content and replacement non-programming content to provide a mediacast to each mediacast content consumer receiving the broadcast or Webcast are therefore quite desirable.

BRIEF SUMMARY

A method of operation in a content insertion system may be summarized as the content insertion system comprising at least one processor and at least one nontransitory processor-readable medium communicatively coupled to the at least one processor, the method including: receiving a mediacast source data flow which comprises a plurality of replaceable content segments interspersed with a plurality of non-replaceable content segments, the replaceable content segments consisting of one or more sections of replaceable content material which includes image content data and the non-replaceable content segments consisting of one or more sections of non-replaceable content material which includes image content data; reviewing at least a portion of the image content data of the received mediacast source data flow for a presence or absence of at least one defined visual content element contained within at least one of the replaceable content material or the non-replaceable content material to determine whether a portion of the received mediacast source data flow corresponds to a non-replaceable content segment or a replaceable content segment based on at least one of a presence or an absence of the defined visual content element; in response to determining the presence of a replaceable content segment, selecting a replacement content segment from a store of replacement content segments of the content insertion system; and modifying the mediacast source data flow by replacing the replaceable content segment with the replacement content segment.

Reviewing at least a portion of the image content data may include reviewing a defined region of a rendering surface of the image content data, the defined region a portion of the rendering surface. The defined region may include a plurality of pixels, and reviewing at least a portion of the image content data may include ignoring at least some of the plurality of pixels in the defined region. Reviewing at least a portion of the image content data may include detecting a content provider identifier tag in the at least a portion of the image content data. Reviewing at least a portion of the image content data may include detecting at least one of a lower third graphic, a chyron graphic, an information ticker graphic, an edge graphic, a score graphic, or text in the at least a portion of the image content data. Reviewing at least a portion of the image content data may include reviewing at least a portion of the image content data to detect a temporally spaced pattern indicative of at least one of a start of at least one of the content segments or an end of at least one of the content segments. Reviewing at least a portion of the image content data may include detecting a color intensity of the at least a portion of the image content data. The one or more sections of replaceable content material and the one or more sections of non-replaceable content material may each include audio content data, the method may further include reviewing at least a portion of the audio content data for a presence or absence of at least one defined auditory content element contained within at least one of the replaceable content material or the non-replaceable content material to determine whether a portion of the received mediacast source data flow corresponds to a non-replaceable content segment or a replaceable content segment based on at least one of a presence or an absence of the defined auditory content element. Reviewing at least a portion of the audio content data may include reviewing at least a portion of the audio content data for a period of silence, and reviewing at least a portion of the image content data comprises detecting a low color intensity. Reviewing at least a portion of the image content data may include reviewing at least a portion of the image content data for a presence or absence of a plurality of defined visual elements contained within at least one of the replaceable content material or the non-replaceable content material to determine whether a portion of the received mediacast source data flow corresponds to a non-replaceable content segment or a replaceable content segment based on at least one of a presence or an absence of the plurality of defined visual content elements, the plurality of defined visual content elements indicative of at least one of a start of at least one of the content segments or an end of at least one of the content segments. Reviewing at least a portion of the image content data may include detecting a presence or absence of at least one edge in the at least a portion of the image content data. Reviewing at least a portion of the image content data may include detecting a presence or absence of a continuous lower third graphic in the at least a portion of the image content data. Reviewing at least a portion of the image content data may include detecting a presence or absence of a content source provider graphic in a lower third portion of the at least a portion of the image content data.

The method of operation in a content insertion system may further include: verifying whether an identified presence or absence of the defined visual content element occurs during a defined expected time period; and determining whether a portion of the received mediacast source data flow corresponds to a non-replaceable content segment or a replaceable content segment based on the verification of the identified presence or absence of the defined visual content element.

Reviewing the at least a portion of the image content data of the received mediacast source data flow for a presence or absence of at least one defined visual content element may further include: determining a start of at least one of the content segments of the mediacast source data flow; and determining an end of at least one of the content segments of the mediacast source data flow.

The method of operation in a content insertion system may further include causing delivery of the modified mediacast source data flow over a network by at least one component of the content insertion system.

Selecting a replacement content segment may include selecting a replacement content segment based at least in part on at least one of a geographic location of a content consumer, a browsing history of the content consumer, a buying history of the content consumer, or a piece of self-reported information provided by the content consumer.

The method of operation in a content insertion system may further include: encoding the replacement content segment as content fragments; and providing the content fragments to a number of content delivery networks for retrieval of the content fragments by content consumers.

The method of operation in a content insertion system may further include reviewing the at least a portion of the image content data of the received mediacast source data flow for a presence or absence of at least one defined visual content element to determine metadata related to at least one of the replaceable content segments or related to at least one of the non-replaceable content segments.

Reviewing the at least a portion of the image content data of the received mediacast source data flow for a presence or absence of at least one defined visual content element to determine metadata may include detecting a title associated with at least one of the replaceable content segments or the non-replaceable content segments. Receiving a mediacast source data flow may include receiving a mediacast source data flow which comprises a plurality of non-replaceable programming content segments interspersed with a plurality of replaceable advertising content segments.

A content delivery system may be summarized as including: at least one communications port communicatively coupleable to receive a mediacast source data flow from a broadcaster or a Webcaster, the mediacast source data flow at least including a plurality of replaceable content segments comprising image content data and a plurality of non-replaceable content segments comprising image content data; at least one nontransitory processor-readable medium which stores a number of processor-executable instructions; and at least one processor communicatively coupled to the at least one communications port and communicatively coupled to the at least one nontransitory processor-readable medium to execute the processor-executable instructions, which execution causes the at least one processor to: receive the mediacast source data flow from the broadcaster or the Webcaster; for each of a number of the content segments of the mediacast source data flow, detect whether the respective content is non-replaceable or replaceable, whereby the at least one processor: reviews at least a portion of the image content data of the received mediacast source data flow for a presence or absence of at least one defined visual content element contained within at least one of the replaceable content material or the non-replaceable content material to determine whether a portion of the received mediacast source data flow corresponds to a non-replaceable content segment or a replaceable content segment based on at least one of a presence or an absence of the defined visual content element; and replace each of at least some of the content segments of the mediacast source data flow identified as being replaceable with at least one replacement content segment.

The at least one processor may review a defined region of a rendering surface of the image content data, the defined region a portion of the rendering surface. The defined region may include a plurality of pixels, and the at least one processor may review at least a portion of the image content data and ignores at least some of the plurality of pixels in the defined region. The at least one processor may detect a content provider identifier tag in the at least a portion of the image content data. The at least one processor may detect at least one of a lower third graphic, a chyron graphic, an information ticker graphic, an edge graphic, a score graphic, or text in the at least a portion of the image content data. The at least one processor may review at least a portion of the image content data to detect a temporally spaced pattern indicative of at least one of a start of at least one of the content segments or an end of at least one of the content segments. The at least one processor may detect a color intensity of the at least a portion of the image content data. The one or more sections of replaceable content material and the one or more sections of non-replaceable content material may each include audio content data, and the at least one processor may review at least a portion of the audio content data for a presence or absence of at least one defined auditory content element contained within at least one of the replaceable content material or the non-replaceable content material to determine whether a portion of the received mediacast source data flow corresponds to a non-replaceable content segment or a replaceable content segment based on at least one of a presence or an absence of the defined auditory content element. The at least one processor may review at least a portion of the audio content data for a period of silence, and may review at least a portion of the image content data to detect a low color intensity. The at least one processor may review at least a portion of the image content data for a presence or absence of a plurality of defined visual elements contained within at least one of the replaceable content material or the non-replaceable content material to determine whether a portion of the received mediacast source data flow corresponds to a non-replaceable content segment or a replaceable content segment based on at least one of a presence or an absence of the plurality of defined visual content elements, the plurality of defined visual content elements indicative of at least one of a start of at least one of the content segments or an end of at least one of the content segments. The at least one processor may detect a presence or absence of at least one edge in the at least a portion of the image content data. The at least one processor may detect a presence or absence of a continuous lower third graphic in the at least a portion of the image content data. The at least one processor may detect a presence or absence of a content source provider graphic in a lower third portion of the at least a portion of the image content data. The at least one processor may verify whether an identified presence or absence of the defined visual content element occurs during a defined expected time period; and determine whether a portion of the received mediacast source data flow corresponds to a non-replaceable content segment or a replaceable content segment based on the verification of the identified presence or absence of the defined visual content element. The at least one processor may review at least a portion of the image content data and determine a start of at least one of the content segments of the mediacast source data flow; and review at least a portion of the image content data and determine an end of at least one of the content segments of the mediacast source data flow. The at least one processor may cause delivery of the modified mediacast source data flow over a network. The at least one processor may select a replacement content segment based at least in part on a geographic location of a content consumer. The at least one processor may encode the replacement content segment as content fragments; and provide the content fragments to a number of content delivery networks for retrieval of the content fragments by content consumers. The at least one processor may review the at least a portion of the image content data of the received mediacast source data flow for a presence or absence of at least one defined visual content element to determine metadata related to at least one of the replaceable content segments or related to at least one of the non-replaceable content segments. The at least one processor may detect a title associated with at least one of the replaceable content segments or the non-replaceable content segments. The at least one processor may receive a mediacast source data flow which includes a plurality of non-replaceable programming content segments interspersed with a plurality of replaceable advertising content segments.

A method of operation in a content type detection system may be summarized as including at least one processor and at least one nontransitory processor-readable medium communicatively coupled to the at least one processor, the method including: receiving a broadcast source data flow which comprises a plurality of content segments of a first content type interspersed with a plurality of content segments of a second content type, the content segments of the first content type consisting of one or more sections of content material of the first content type which includes image content data and the content segments of the second content type consisting of one or more sections of content material of the second content type which includes image content data; reviewing at least a portion of the image content data of the received broadcast source data flow to detect at least one content type of the content segments; and storing content type data in the at least one nontransitory processor-readable medium of the content type detection system, the content type data indicative of the detected at least one content type of the content segments.

Reviewing at least a portion of the image content data may include reviewing a defined region of a rendering surface of the image content data, the defined region a portion of the rendering surface. The defined region may include a plurality of pixels, and reviewing at least a portion of the image content data may include ignoring at least some of the plurality of pixels in the defined region. Reviewing at least a portion of the image content data may include detecting a content provider identifier graphic in the at least a portion of the image content data. Reviewing at least a portion of the image content data may include detecting at least one of a lower third graphic, a chyron graphic, an information ticker graphic, an edge graphic, a score graphic, or text in the at least a portion of the image content data. Reviewing at least a portion of the image content data may include reviewing at least a portion of the image content data to detect a temporally spaced pattern indicative of at least one of a start of at least one of the content segments or an end of at least one of the content segments. Reviewing at least a portion of the image content data may include detecting a color intensity of the at least a portion of the image content data. The one or more sections of the content material of the first content type and the one or more sections of the content material of the second content type may each include audio content data, the method may further include reviewing at least a portion of the audio content data for a presence or absence of at least one defined auditory content element contained within at least one of the content material of the first content type or the content material of the second content type to determine whether a portion of the received broadcast source data flow corresponds to a content segment of the first content type or a content segment of the second content type based on at least one of a presence or an absence of the defined auditory content element. Reviewing at least a portion of the audio content data may include reviewing at least a portion of the audio content data for a period of silence, and reviewing at least a portion of the image content data comprises detecting a low color intensity. Reviewing at least a portion of the image content data may include reviewing at least a portion of the image content data for a presence or absence of a plurality of defined visual elements contained within at least one of the content material of the first content type or the content material of the second content type to determine whether a portion of the received broadcast source data flow corresponds to a content segment of the first content type or a content segment of the second content type based on at least one of a presence or an absence of the plurality of defined visual content elements, the plurality of defined visual content elements indicative of at least one of a start of at least one of the content segments or an end of at least one of the content segments. Reviewing at least a portion of the image content data may include detecting a presence or absence of at least one edge in the at least a portion of the image content data. Reviewing at least a portion of the image content data may include detecting a presence or absence of a continuous lower third graphic in the at least a portion of the image content data. Reviewing at least a portion of the image content data may include detecting a presence or absence of a content source provider graphic in a lower third portion of the at least a portion of the image content data.

The method of operation in a content type detection system may further include: verifying whether an identified presence or absence of the defined visual content element occurs during a defined expected time period; and determining whether a portion of the received broadcast source data flow corresponds to a non-replaceable content segment or a replaceable content segment based on the verification of the identified presence or absence of the defined visual content element.

Reviewing the at least a portion of the image content data of the received broadcast source data flow for a presence or absence of at least one defined visual content element may further include: determining a start of at least one of the content segments of the broadcast source data flow; and determining an end of at least one of the content segments of the broadcast source data flow.

The method of operation in a content type detection system may further include reviewing the at least a portion of the image content data of the received broadcast source data flow for a presence or absence of at least one defined visual content element to determine metadata related to at least one of the content segments.

Reviewing the at least a portion of the image content data of the received broadcast source data flow for a presence or absence of at least one defined visual content element to determine metadata may include detecting a title associated with at least one of the content segments.

The method of operation in a content type detection system may further include: reviewing at least a portion of the image content data of the received broadcast source data flow to detect at least one transition between content segments of the first content type and content segments of the second content type; and storing content type transition data in the at least one nontransitory processor-readable medium of the content type detection system, the content type transition data indicative of the detected at least one transition between content segments of the first content type and content segments of the second content type.

Receiving a broadcast source data flow may include receiving a broadcast source data flow which includes a plurality of programming content segments interspersed with a plurality of advertising content segments.

A content type detection system may be summarized as including at least one communications port communicatively coupleable to receive a broadcast source data flow from a broadcaster, the broadcast source data flow at least including a plurality of first content type content segments comprising image content data and a plurality of second content type content segments comprising image content data; at least one nontransitory processor-readable medium which stores a number of processor-executable instructions; and at least one processor communicatively coupled to the at least one communications port and communicatively coupled to the at least one nontransitory processor-readable medium to execute the processor-executable instructions, which execution causes the at least one processor to: receive the broadcast source data flow from the broadcaster; for each of a number of the content segments of the broadcast source data flow, detect whether the respective content is of the first content type or the second content type, whereby the at least one processor: reviews at least a portion of the image content data of the received broadcast source data flow to detect at least one content type of the content segments; and stores content type data in the at least one nontransitory processor-readable medium of the content type detection system, the content type data indicative of the detected at least one content type of the content segments.

The at least one processor may review a defined region of a rendering surface of the image content data, the defined region a portion of the rendering surface. The defined region may include a plurality of pixels, and the at least one processor may review at least a portion of the image content data and ignore at least some of the plurality of pixels in the defined region. The at least one processor may detect a content provider identifier tag in the at least a portion of the image content data. The at least one processor may detect at least one of a lower third graphic, a chyron graphic, an information ticker graphic, an edge graphic, a score graphic, or text in the at least a portion of the image content data. The at least one processor may review at least a portion of the image content data to detect a temporally spaced pattern indicative of at least one of a start of at least one of the content segments or an end of at least one of the content segments. The at least one processor may detect a color intensity of the at least a portion of the image content data. The one or more sections of the content material of the first content type and the one or more sections of the content material of the second content type may each include audio content data, and the at least one processor may review at least a portion of the audio content data for a presence or absence of at least one defined auditory content element contained within at least one of the content material of the first content type or the content material of the second content type to determine whether a portion of the received broadcast source data flow corresponds to a content segment of the first content type or a content segment of the second content type based on at least one of a presence or an absence of the defined auditory content element. The at least one processor may review at least a portion of the audio content data for a period of silence, and reviewing at least a portion of the image content data may include detecting a low color intensity. The at least one processor may review at least a portion of the image content data for a presence or absence of a plurality of defined visual elements contained within at least one of the content material of the first content type or the content material of the second content type to determine whether a portion of the received broadcast source data flow corresponds to a content segment of the first content type or a content segment of the second content type based on at least one of a presence or an absence of the plurality of defined visual content elements, the plurality of defined visual content elements indicative of at least one of a start of at least one of the content segments or an end of at least one of the content segments. The at least one processor may detect a presence or absence of at least one edge in the at least a portion of the image content data. The at least one processor may detect a presence or absence of a continuous lower third graphic in the at least a portion of the image content data. The at least one processor may detect a presence or absence of a content source provider graphic in a lower third portion of the at least a portion of the image content data. The at least one processor may verify whether an identified presence or absence of the defined visual content element occurs during a defined expected time period; and determine whether a portion of the received broadcast source data flow corresponds to a non-replaceable content segment or a replaceable content segment based on the verification of the identified presence or absence of the defined visual content element. The at least one processor may review at least a portion of the image content data to determine a start of at least one of the content segments of the broadcast source data flow; and review at least a portion of the image content data to determine an end of at least one of the content segments of the broadcast source data flow. The at least one processor may review the at least a portion of the image content data of the received broadcast source data flow for a presence or absence of at least one defined visual content element to determine metadata related to at least one of the content segments. The at least one processor may detect a title associated with at least one of the content segments. The at least one processor may review at least a portion of the image content data of the received broadcast source data flow to detect at least one transition between content segments of the first content type and content segments of the second content type; and store content type transition data in the at least one nontransitory processor-readable medium of the content type detection system, the content type transition data indicative of the detected at least one transition between content segments of the first content type and content segments of the second content type. The at least one processor may receive a broadcast source data flow which includes a plurality of programming content segments interspersed with a plurality of advertising content segments.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
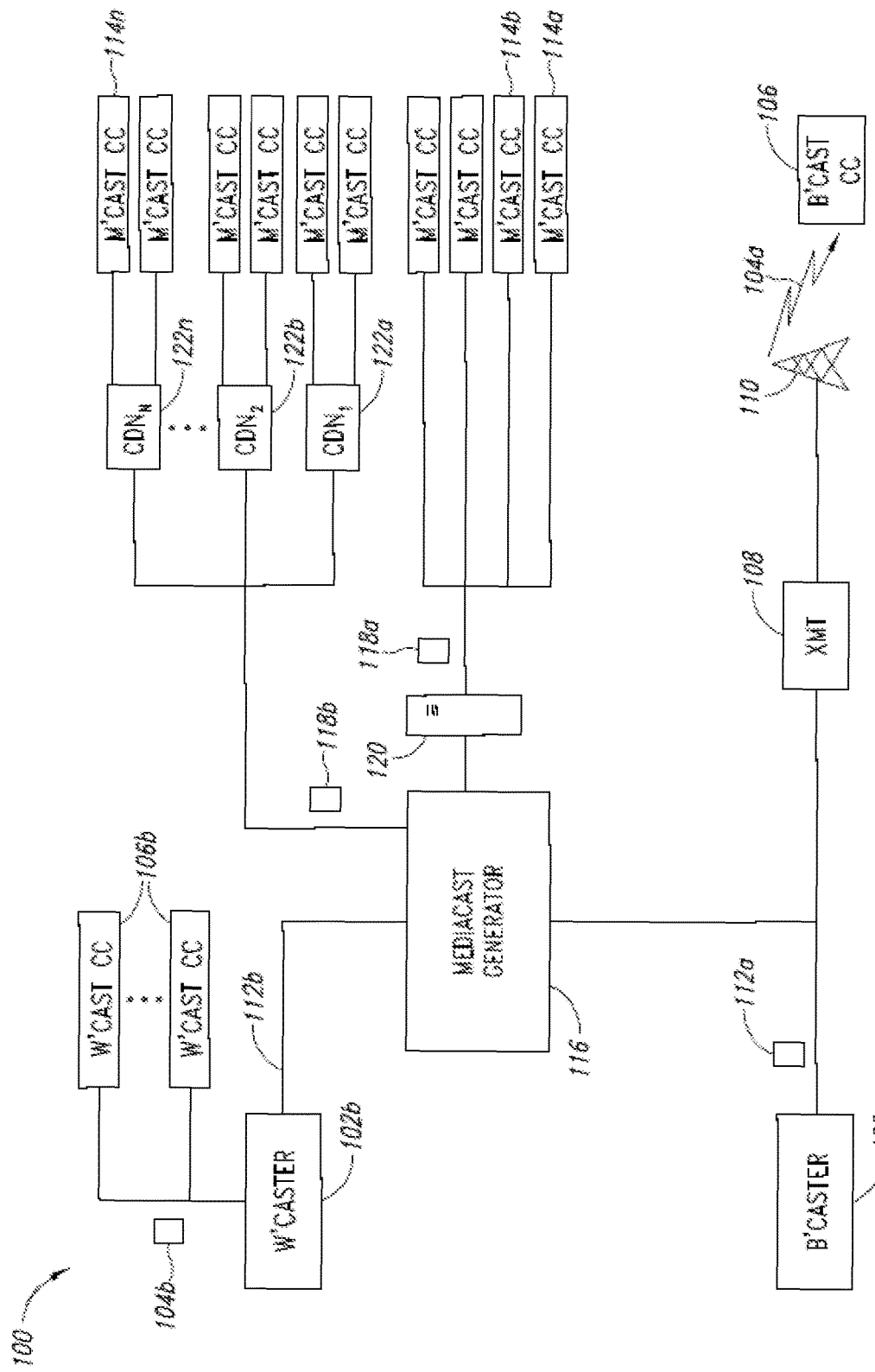
FIG. 1 is a schematic diagram of a networked environment, including a broadcaster and a Webcaster, a number of broadcast or Webcast content consumers, a mediacast generation system operable to generate a plurality of mediacasts, and an optional content delivery network (CDN) to deliver the mediacasts to respective mediacast content consumers, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, broadcast systems including radio and television broadcast systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

One or more embodiments disclosed herein are directed to systems, methods, and components operative for a reliable implementation of intelligent video content and program type detection and property extraction that works entirely on the basis of extrapolating information about content by only using the clues contained within the content itself. By using clues contained within the content itself, as opposed to markers provided by a content provider (e.g., a broadcaster, media-caster, etc.), the content provider does not have to affirmatively put any markers into a broadcast or mediacast nor affirmatively modify such. Further, since the disclosed embodiments can autonomously detect video content and program type properties (e.g., discern between programming and non-programming content) based on the content itself, cooperation from the content providers is not required to implement the systems and methods discussed herein. In fact, the content providers do not need to be aware that content type detection and property extraction systems and methods are being implemented.

As used herein, the terms broadcast or Webcast programming refers to a sequence of content intend to be broadcast or Webcast by a broadcaster or Webcaster. The broadcast or Webcast programming may include programming content and non-programming content. As used herein, programming content refers to content which is the primary or main subject of the broadcast or Webcast. Examples of programming content include news segments for a video news station. As used herein, non-programming content refers to content which is not the primary or main subject of the broadcast or Webcast. Examples of non-programming content include advertisements or commercials. The programming content and/or the non-programming content may be either non-replaceable or replaceable, as identified by an entity, for example a broadcaster or Webcaster. Non-replaceable content is content that is not to be replaced; examples include news segments or sports segments. Replaceable content is content that may be replaced; examples include a block of advertisements video news station or programming segment of a sports video station. As used herein, the term new or replacement programming and non-programming content segments refers to content used to generate a modified mediacast, in addition to the broadcast or Webcast programming. Such may include programming content and non-programming content. Such may be substituted for replaceable programming or replaceable non-programming content in generating a mediacast or otherwise incorporated therein. Alternatively, new or replacement programming and non-programming content segments such may be used in addition to replaceable programming or replaceable non-programming content in generating mediacasts. As used herein, manifest content refers to a set of entries that specify locations or specific properties of content or media fragments, specifying a linear or sequential order. A used herein, manifest consumer device refers to a mediacast content consumer device (e.g., media player executing on a processor-based device) that requests and utilizes manifest content. As used herein, dynamic manifest refers to a manifest file that is generated upon a request of a mediacast content consumer device. As used herein, a content or media fragment refers to a digital media "file" into which content has been broken, typically having a duration of 2-10 seconds. Presently, content or media fragments are primarily based on fragmented mp4 (FMP4) or MPEG TS (M2TS).

The headings and Abstract of the Disclosure provided herein are for convenience only and do not interpret the scope or meaning of the embodiments.

System Overview—Delivery of Programming to Content Consumers

FIG. 1 shows an environment 100 including a television broadcaster 102a delivering a broadcast 104a to a plurality of broadcast content consumers (illustrated collectively) 106 via a broadcast transmitter 108 and antenna 110. The environment 100 may additionally, or alternatively, include a Webcaster 102b that provides Webcasts 104b to a plurality of Webcast consumers 106b via servers and various networks (e.g., Internet). Generally, the environment 100 may include one or more terrestrial broadcasters, cable broadcasters, satellite broadcasters, Webcasters, multi-casters, etc.

The broadcast 104a or Webcast 104b (collectively 104) consists of broadcaster or Webcaster programming (collectively "mediacaster programming"), which includes a variety of programming content and a variety of non-programming content, which may be divided up into segments. Programming content segments are typically portions of the programming that are the principal or main subjects of the broadcast or Webcast, and may be used to identify or characterize the broadcaster or Webcaster. Examples of programming content include news, weather, traffic, talk shows, comedy sketches, video content, or the like. Non-programming content segments are the remaining portions of the programming which are not the principal or main subjects of the broadcast or Webcast. Examples of non-programming content include paid advertisements or commercials, legally required announcements (e.g., station identification announcements), and public service announcements.

Many broadcasters or Webcasters 102 also would like to provide all or a portion of their programming to mediacast content consumers 114a, 114b-114n (ten illustrated, three called out, collectively 114) via alternative channels such as Webcasts, podcasts, streaming and similar delivery methods. Such alternative channels typically provide for on-demand delivery, for example as a unicast streaming, or in some instances as a multicast streaming to the media content consumers 114. The alternative channels typically permit geographically diverse mediacast content consumers 114 to access the programming content using communications technologies other than local over the air (i.e., "OTA" and/or terrestrial) broadcast transmission or transmission via local media distributors such as television networks.

To accommodate the diverse tastes and interests of the respective mediacast content consumers 114, the programming 112 may be further apportioned into replaceable programming content segments and non-replaceable programming content segments. Replaceable programming content segments include any portion of the programming identified by the broadcaster, Webcaster or other entity as being eligible for being replaced by replacement content. Non-replaceable programming content may include any portion of the programming identified by the broadcaster or Webcaster or other entity as not eligible for replacement. Typical examples of non-replaceable programming content include television talk show segments, news, sports, weather, and financial segments within the programming supplied by the broadcaster or Webcaster.

Optionally, the non-programming content segments (e.g., commercials, advertisements) of the broadcast or Webcast provided by the broadcaster or Webcaster may be apportioned into replaceable non-programming content segments and non-replaceable non-programming content segments. Replaceable non-programming content segments can include advertisements or open-air "spots" carried by the programming supplied by the broadcaster or Webcaster that may have limited or no value to the mediacast content consumers 114. Examples include advertisements for products and services available in the broadcaster or Webcaster's home market, but unavailable in markets where many or even all of the mediacast content consumers 114 may be located. Non-replaceable non-programming content segments can include legally required station identification announcements, public service announcements, emergency broadcasting network tests, and the like. Non-replaceable non-programming content segments can additionally or alternatively include advertisements or commercials with generic appeal or related to a wider market, for instance a national market. Non-replaceable non-programming content segments can additionally or alternatively include advertisements or commercials for which Web distribution has been guaranteed, for instance guaranteed by the broadcaster or Webcaster.

As depicted in FIG. 1, a mediacast generation system 116 may be coupled to receive programming 112a, 112b (collectively 112) that constitutes the broadcast or Webcast. The mediacast generation system 116 may be configured to generate, produce or otherwise provide mediacasts 118a, 118b (two shown, collectively 118) for respective ones of the mediacast content consumers 114.

While illustrated as a single mediacast generation system 116 communicatively coupled to both a broadcaster 102a and Webcaster 102b, many implementations will employ two or more separate mediacast generation systems 116, for example a respective mediacast generation system 116 for each of the broadcaster(s) and/or Webcaster(s). All or a portion of the mediacast generation system 116 may be separately or co-located. All or a portion of the mediacast generation system 116 may be co-located at the broadcaster or Webcaster facilities. All or a portion of the mediacast generation system 116 may be located separately from the broadcaster or Webcaster facilities. All or a portion of the mediacast generation system 116 may be implemented "in the cloud" as a virtualized system or component. All or a portion of the mediacast generation system 116 may be co-located at the mediacast content consumer 114.

In some implementations, the mediacasts 118 include non-programming content, for instance advertisements or commercials. The non-programming content may include non-programming content from the broadcast or Webcast 104. The non-programming content may include new or replacement non-programming content, which did not appear in the broadcast or Webcast 104. Such new or replacement non-programming content may substitute for or replace in the mediacast 118, in whole or in part, non-programming content from the broadcast or Webcast 104.

As discussed in further detail below, the mediacast generation system 116 may be operative to detect that a particular type of content segment in the broadcast or Webcast programming is commencing or ending by analyzing the content itself, as oppose to reviewing metadata or markers intended to signal beginnings or ends of content segments. This detection facilitates the automated generation of a mediacast with new or replacement programming content segments and/or new or replacement non-programming content segments combined with the non-replaceable programming content segments supplied by the broadcaster or Webcaster. As explained in more detail herein, the detection of beginnings and ends of content segments may also be part of a trigger condition for the buffering of content, for instance non-replaceable content segments, and/or the subsequent unbuffering, delivery or playing of the buffered content.

As illustrated in FIG. 1, the mediacast generation system 116 may transmit or deliver the mediacasts 118 to respective mediacasts content consumers 114 via one or more networks (e.g., Internet, local area networks, wide area networks, wired networks, wireless networks). The mediacast generation system 116 may include, or may employ, one or more server computer systems to transmit or deliver the mediacasts 118.

Additionally or alternatively, the mediacast generation system 116 may optionally employ one or more content delivery networks (CDNs) 122a-122n (three illustrated, collectively 122) to cache, store, or distribute all or a portion of the mediacasts 118. Although the broadcaster or Webcaster 102 may have access to sufficient infrastructure to support the delivery of hundreds or thousands of mediacasts 118 directly to each of the mediacast content consumers 114, in many instances the broadcaster or Webcaster 102 may alternatively route the mediacasts 118 for at least a portion of the mediacast content consumers 114 through a CDN 122. A CDN 122 supplies the necessary infrastructure in the form of various network servers, switches, routers and the like useful in delivering the mediacasts 118 to each of the content consumers 114. CDNs 122 can be regionally located in closer proximity to the mediacast content consumers 114 and can be linked to the broadcaster or Webcaster via one or more high speed or high bandwidth connections to minimize the latency and improve the overall mediacast experience of each of the mediacast content consumers 114. In some instances, the CDNs 122 provide network redundancy to improve the reliability of the connection between the mediacast content consumers 114 and the broadcaster or Webcaster 122.

Additionally or alternatively, the mediacast generation system 116 may transmit or deliver the mediacasts 118 via terrestrial broadcasts, satellite broadcasts, cable broadcasts, multicasts, unicasts, or by any other suitable communication system.

Mediacast Generation System

Figure 2:
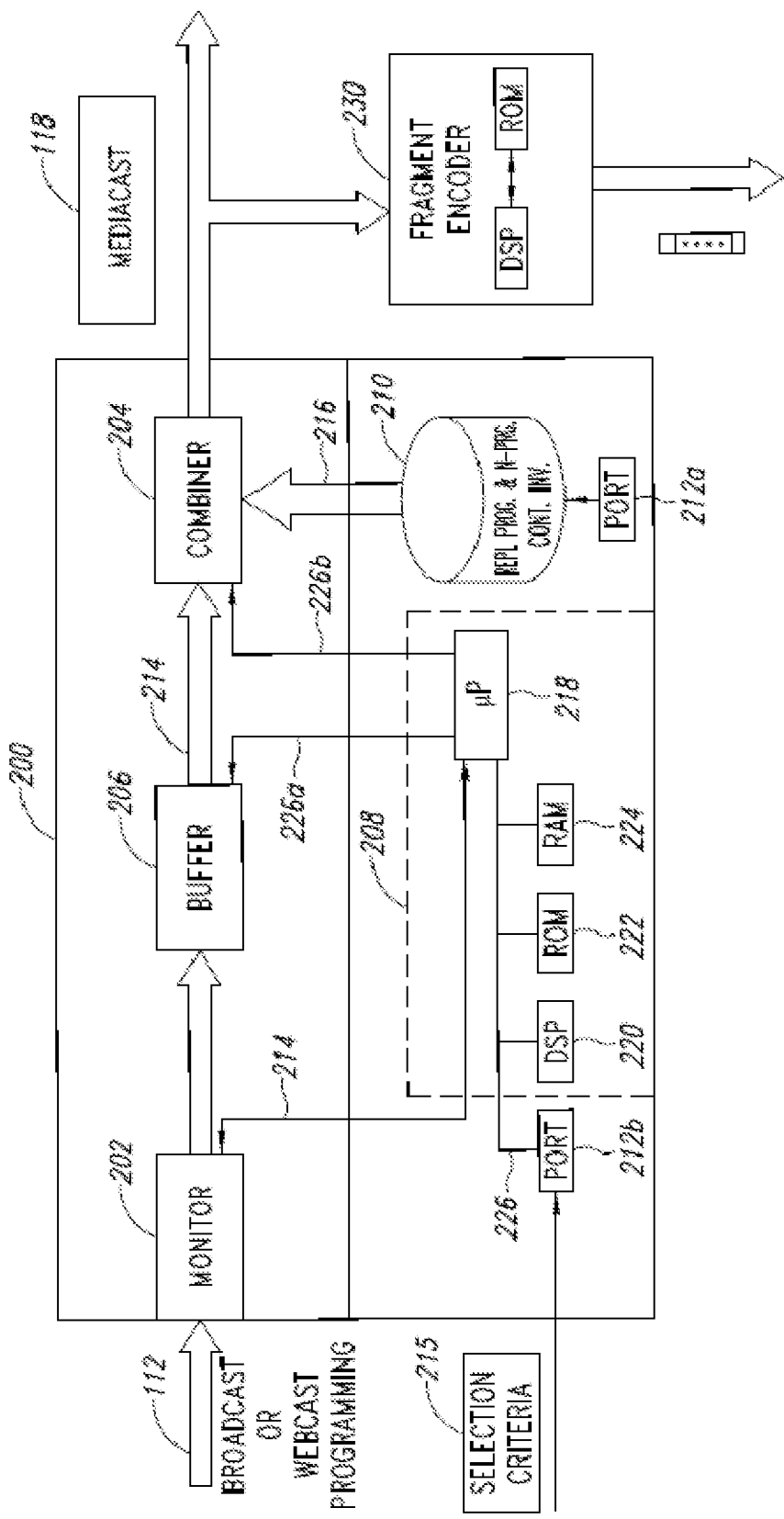
FIG. 2 is a schematic diagram of a mediacast generation system including an monitor and combiner coupled to detect replaceable programming and non-programming content segments in broadcasts or Webcasts, optionally insert replacement programming and non-programming content segments for the replaceable content to generate a mediacast and an optional fragment encoder coupled to encode the mediacast as content or media fragments, according to one illustrated embodiment.

FIG. 2 shows an example of a mediacast generation system 200, according to one illustrated embodiment. The mediacast generation system 200 may be configured physically as a single system, or may comprise multiple independent systems.

The mediacast generation system 200 includes a monitor 202 to detect content type or content transitions in the programming and a combiner 204 operable to selective combine portions of the broadcast or Webcast programming 112 (FIG. 1) with new or replacement content. The mediacast generation system 200 may also include a buffer 206, a control subsystem 208, and a nontransitory computer- or processor-readable medium 210, each directly or indirectly communicatively coupled with the monitor 202 and combiner 204. As explained in more detail below, the buffer 206 is communicatively coupled, configured and/or controlled to temporarily buffer or store broadcast or Webcast programming content and selectively release, deliver or unbuffer the programming content on occurrence of certain conditions. The control subsystem 208 is communicatively coupled and configured to control the operation of the mediacast generation system 200, including the various components thereof. The nontransitory computer- or processor-readable medium 210 stores new or replacement programming content segments and/or new or replacement non-programming content segments for use in combining with portions of the broadcast or Webcast programming 112 (FIG. 1) to create the mediacasts 118 (FIG. 1) to be delivered to mediacast content consumers via one or more communications systems (e.g., Webcast, broadcast, etc.).

The mediacast generation system 200 is communicatively coupled to receive original broadcast or Webcast programming 112 from a broadcaster or Webcaster 102 (or other content provider). For example, the mediacast generation system 200 may be communicatively coupled to receive a video feed (e.g., digital or analog) from a video board of a television broadcaster.

An optional communications port 212a, permits the receipt of new or replacement programming content segments and/or new or replacement non-programming content segments from an external source, for example from an external advertiser, external advertising marketplace, external replacement programming content provider and the like. An optional communications port 212b allows receipt of commands, instructions, data, and programming. For example, in some embodiments various types of selection criterion 215 may be received via communications port 212b. While two ports 212a, 212b (collectively 212) are illustrated, the mediacast generation system 200 may include fewer or greater number of ports 212.

As noted above, a primary function of the mediacast generation system 200 is to detect content type or content transitions that signify the beginning and/or ending of the different content segments. The beginning and ending of at least certain content segments are conditions that may wholly or partially control an operational state of the combiner 204, and optionally of the buffer 206. The occurrence of such may for example, satisfy one condition for triggering the replacement of replaceable programming content segments with replacement programming to generate or create the mediacasts 118. The occurrence of such may for example, satisfy one condition for triggering the replacement of replaceable non-programming content segments with new or replacement non-programming content segments to generate or create the mediacasts 118. In either situation, a second condition may need to be satisfied, that is that a current content segment be completed before switching between the broadcast or Webcast and some repository of new or replacement content. Likewise, the mediacasts 118 may include new or replacement non-programming content segments, for example, selected based upon one or more mediacast content consumer demographics, locations, etc., to create a mediacast 118 uniquely tailored to an individual mediacast content consumer 114.

In some implementations, the monitor 202 detects content type or content transitions in programming content. The monitor 202 may, for example, detect the start or end of replaceable programming or replaceable non-programming content segments in the originating broadcast or Webcast programming 112. The monitor 202 may, for example, detect the start or end of replaceable programming content segments, for instance, entertainment content (e.g., music videos) in the originating broadcast or Webcast programming 112.

The buffer 206 is downstream from the monitor 202 and may buffer original broadcast or Webcast programming 112 when necessary or desirable. For example, such may allow time-shifting of content segments contained in the originating broadcast or Webcast programming 112, which may increase flexibility of the mediacast generation system 200. For example, where a duration of new or replacement programming or non-programming content segments either individually or cumulatively match a duration of the replaceable programming or non-programming content segments that they are to replace, the duration of the original broadcast or Webcast programming 112 stored by the buffer 206 may remain constant or not change. Where the duration of new or replacement programming or non-programming content segments either individually or cumulatively exceed a duration of the replaceable programming or non-programming content segments that they are to replace, the original broadcast or Webcast programming 112 stored by the buffer 206 may grow or increase. Where a duration of new or replacement programming or non-programming content segments is less than a duration of the corresponding replaceable programming or non-programming content segments either individually or cumulatively that they are to replace, the broadcast or Webcast programming stored by the buffer 206 may shrink or be reduced. Notably, while the contents of the buffered may be played out during non-replaceable content segments of the broadcast, the buffer content is reduced by playing content from the buffer during replaceable content segments since there is no simultaneous storing to the buffer during these periods. The buffer may function as a queue, receiving new content segments at one end of the queue, while playing previously received content segments from the other end of the queue. The buffer 206 may advantageously allow selection of new or replacement programming and non-programming content segments having durations without particular regard to trying to match a duration of the replaceable programming and non-programming content segments that they are to replace.

The duration of any asynchronicity between the originating broadcast or Webcast programming 112 and the mediacast 118 may be permitted to "float"—in other words, the selection of replacement programming and non-programming segments may be performed without specific regard to the duration of the new or replacement programming or non-programming segments or the duration of the replaceable programming or non-programming segments being replaced. In at least some implementations, new or replacement programming and non-programming content segments are not selected until content type or content transitions are detected in the originating broadcast or Webcast programming 112 by the monitor 202. Upon detection by the monitor 202 a start of a non-replaceable content segment in the broadcast or Webcast programming 112, buffering of the non-replaceable originating broadcast or Webcast programming 112 to the buffer 206 can be started. Upon detection by the monitor 202 of an end of a non-replaceable content segment (e.g., programming content, non-programming content) in the broadcast or Webcast programming 112, delivery of a current new or replacement content segment to the combiner 204 may be allowed to finish, then the buffered content may be delivered from the buffer 206 to the combiner 204.

The combiner 204, also sometimes referred to as an alternative content inserter, is coupled downstream of the buffer 206 in this illustrated embodiment. The combiner 204 selectively combines portions of the broadcast or Webcast programming 112 (e.g., non-replaceable content segment) with new or replacement programming and non-programming content segments to generate, create or otherwise produce the mediacasts 118. For example, the combiner 204 may combine material from the new or replacement programming and non-programming content segment inventory 210 with non-replaceable programming and non-programming content segments of the originating broadcast or Webcast programming 112. For instance, replaceable programming content segments (e.g., news video segments) appearing in the originating broadcast or Webcast programming 112 may be replaced with replacement programming content segments (e.g., news video segments selected based at least in part on mediacast content consumer specifications). In some instances, the new or replacement programming and non-programming content segments may be targeted for a particular mediacast consumer or group of consumers. In some instances, the new or replacement non-programming content may be more appropriate for wider audience than the replaceable non-programming content in the broadcast or Webcast which is being replaced.

The combiner 204 can take a variety of forms, as simple as a switch that selectively couples a downstream component or output of the mediacast generation system 200 alternatively between a first input 214 (e.g., from buffer 206) that carries the originating broadcast or Webcast programming 112 and a second input 216 such as the insertion material inventory 210 that carries the replacement programming and non-programming content segments.

The control subsystem 208 may take a variety of forms. Typically, the control subsystem 208 will include one or more controllers, for example, microprocessors 218, DSPs 220, ASICs, PGAs, microcontrollers or the like. The control subsystem 208 will also typically include one or more nontransitory nonvolatile memories such as ROM or FLASH memory 222 and/or one or more volatile memories such as RAM 224. One or more communications ports 212, for example, parallel communications ports (e.g., Ethernet port) or serial communications ports (e.g., Universal Serial Bus ports) may be considered part of the control subsystem 208 or may be considered separate therefrom. The one or more communications ports 212 may allow wired and/or wireless communications with an alternative source of replacement programming and non-programming content segments. The one or more communications ports 212 may allow wired and/or wireless communications to receive instructions, commands, data or programming (e.g., firmware upgrades).

The various components of the control subsystem 208 may be coupled via one or more buses 226 (only one shown), for example, one or more power buses, communications buses, instruction buses, address buses, data buses, etc.

The control subsystem 208 is configured or programmed to control the operation of the mediacast generation system 200. The control subsystem 208 is communicatively coupled to receive via signal line 214 one or more signals or data packets upon detection of the start, end, duration, or any combination thereof of a replaceable programming content segment, replaceable non-programming content segment, or non-replaceable programming content segment in the broadcast or Webcast programming 112. The one or more signals or data packets may also be indicative of other information, for instance, the type of content segment, content of the content segment, format of the content segment, or language of the content segment.

The control subsystem 208 may, for example, determine to insert a new or replacement programming content segment upon detecting a start of a replaceable programming content segment in the broadcast or Webcast programming 112. The control subsystem 208 provides control signals to the buffer 206 via a buffer control line 226a to control the buffering or caching of originating broadcast or Webcast programming 112 by the buffer 206. The control subsystem 208 provides control signals to the combiner 204 via combiner control line 226b to control the combining of new or replacement programming and/or non-programming content segments with non-replaceable programming and/or non-programming content segments of the broadcast or Webcast programming 112. The control signals may cause the buffer 206 to selectively store or buffer originating broadcast or Webcast programming 112 while the combiner 204 is combining or inserting or placing replacement programming or non-programming content segments to generate or create the mediacast 118.

In one or more implementations, one or more optional fragment encoders 230 may be positioned downstream of the mediacast generation system 200, or may be integrated therewith. Such may be particularly useful where the mediacasts will be delivered via "chunk based" delivery, for example via one or more CDNs 122 (FIG. 1).

The mediacast generation system 200 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement programming or non-programming content segments do not need to be exactly the same length or duration as the replaceable programming or non-programming content segments they supplant. Additionally, or alternatively, the mediacast generation system 200 may in some respects be similar or identical in structure and/or operation to that described in U.S. patent application publication No. 2007/0074243. Additionally, or alternatively, the mediacast generation system 200 may in some respects be similar or identical in structure and/or operation to that described in U.S. Pat. No. 6,577,716.

Figure 5:
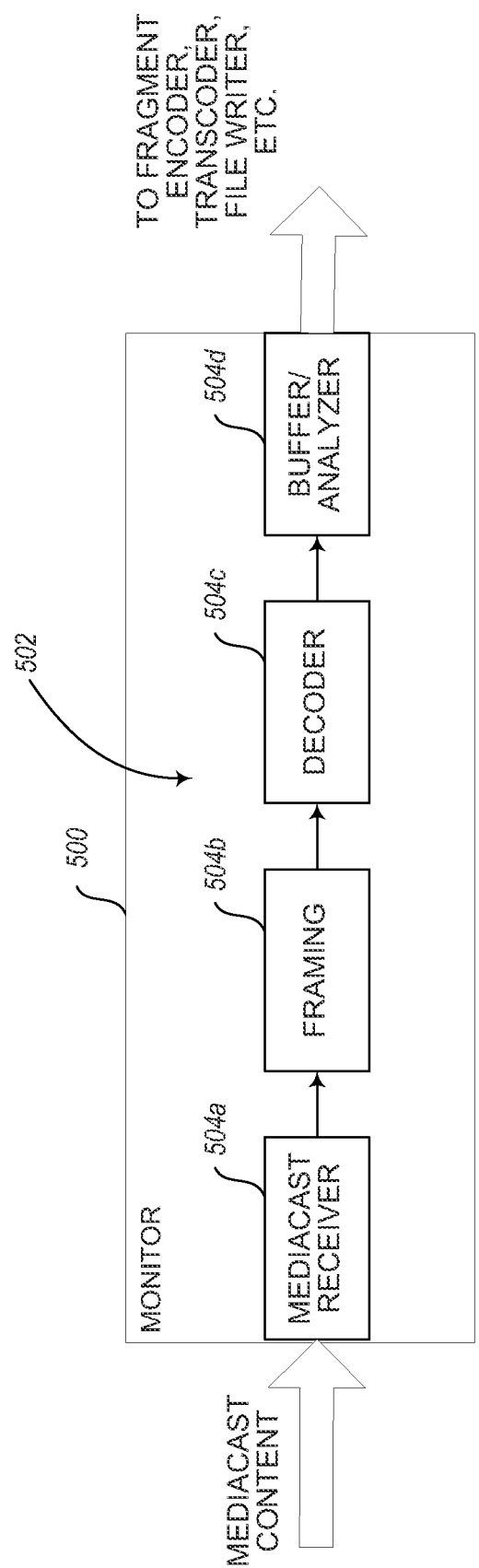
FIG. 5 is a schematic diagram of a monitor of a mediacast content detection system, according to one illustrated embodiment.

FIG. 5 shows an example of a monitor 500 that may be implemented as a component of the mediacast generation system 200 of FIG. 2, according to one illustrated embodiment. In general, one purpose of the monitor 500 is to receive a mediacast source data flow from a content provider and analyze it in real-time (or non-real-time) for boundaries between non-replaceable content (e.g., programming content) and replaceable content (e.g., advertisements).

To allow flexibility in analyzing content streams, the monitor 500 utilizes a modular design defined by a grouping of system chains 502. Each system chain 502 analyzes a single mediacast source data flow. Within each system chain 502, a collection of data channels 504 is strung together. FIG. 5 illustrates a single system chain 502 comprising four data channels—a mediacast receiver 504a, a framing module 504b, a decoder 504c, and a buffer/analyzer 504d. The data channels 504 are assembled in such a way so that they are operative to acquire the mediacast source data flow at the mediacast receiver 504a, decode the attributes and content data (e.g., image content data, audio content data) at the framing module 504b and the decoder 504c, and analyze and/or buffer the content data at the buffer/analyzer 504d. The analyzed content data may be output to a fragment encoder (e.g., the fragment encoder 230 of FIG. 2), output to a transcoder (e.g., a 32 kbps transcoder), output to a file writer, etc. In some embodiments, the output of the buffer/analyzer 504d may be forwarded to multiple components, for example, to form one or more transcoding or archiving systems. Advantageously, this modular set up allows for a single mediacast source data flows to be sent to multiple unique outputs without requiring any changes by the content provider or content producer. Each new output may be added or removed in real-time without stopping the main input dataflow.

In some embodiments, the framing module 504b may divide the video content data from the audio content data of a mediacast source data flow. In these embodiments, the decoder 504c may comprise separate audio and video decoders, and the buffer/analyzer 504d may comprise separate audio and video buffers and/or separate audio and video analyzers. In some embodiments, the analyzed video content data and analyzed audio content data may both be sent to one or more outputs, while only one of the video content data and audio content data is sent to different one or more outputs. For example, analyzed video content data and analyzed audio content data may be sent for playback on a streaming client configured for video and audio playback, while only the analyzed audio content may be sent to a streaming client configured only for audio playback.

Relative Synchronization of Mediacasts with Respect to Broadcaster or Webcaster Programming As discussed above, programming content segments are considered either replaceable or non-replaceable. Non-replaceable content segments may include one or more time sensitive features, for example news at the top of the hour and at 30 minutes after the hour, a real-time traffic report, a real-time phone call from a listener or to a personality, etc. Thus, the systems and method herein are capable of operating with live content and live broadcasting. All content consumers, whether broadcast or Webcast content consumers, may rely upon the timeliness of the news segments, i.e., the segments should occur as close as possible if not at the top of the hour and at 30 minutes after the hour. Minimizing asynchronicity between the original broadcast or Webcast and the plurality of modified mediacasts delivered to the plurality of mediacast content consumers is therefore desirable.

Figure 3:
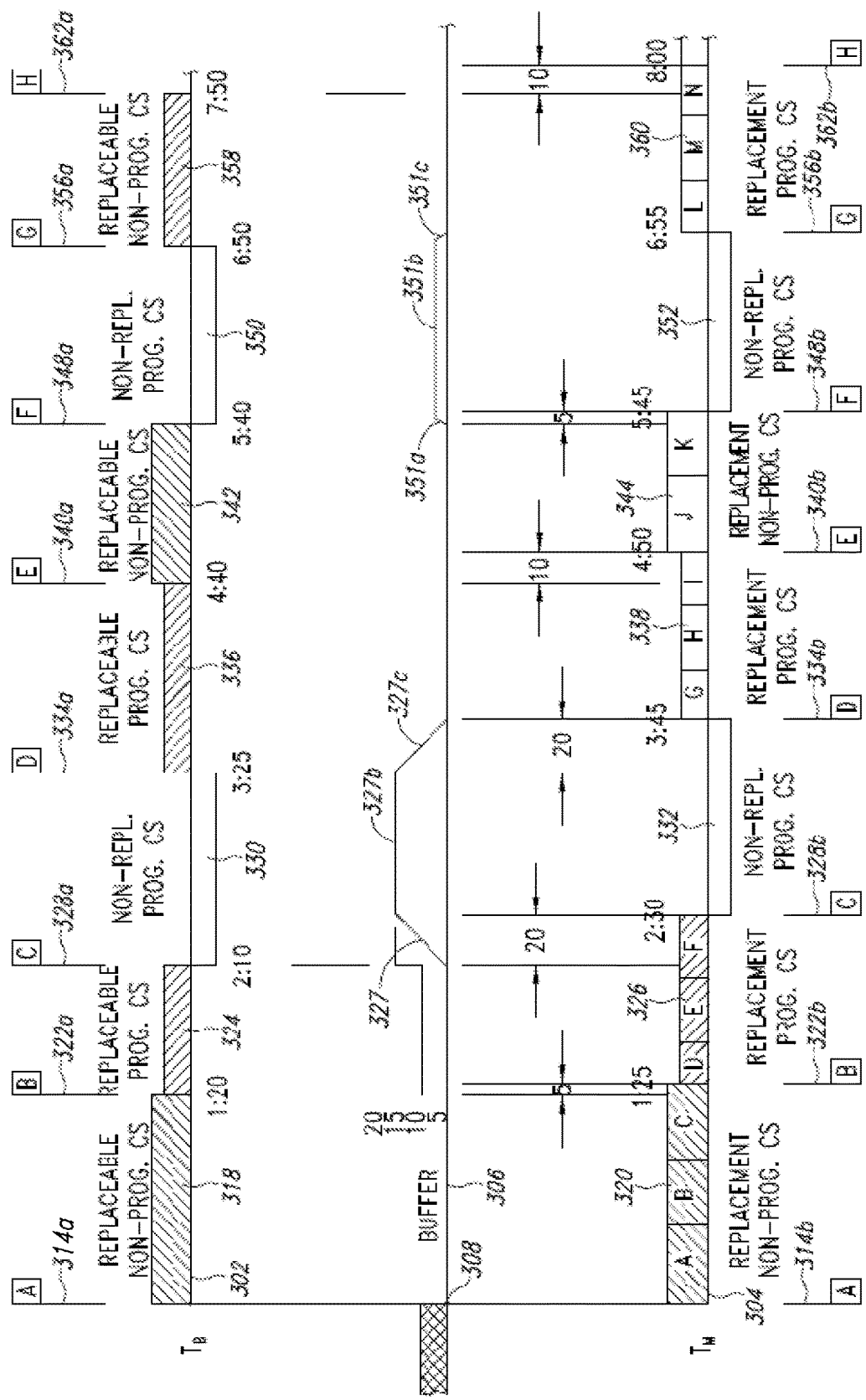
FIG. 3 is a timing diagram of a networked environment depicting the temporal relationship between programming provided as a broadcast or Webcast and an example mediacast delivered to a mediacast content consumer; and specifically illustrating increasing and decreasing asynchronicity between the programming and the mediacast, according to one illustrated embodiment.

FIG. 3 shows an example broadcast timeline ($T_B$) 302 and an example mediacast timeline ($T_M$) 304. Asynchronicity between portions of the broadcast or Webcast programming 302 and the corresponding portions of the mediacast 304 may be attributed to differences in duration or length between replacement content segments or material and the replaceable content segments or materials which they replace. Such may be due to individual differences in length or duration, and/or due to differences in cumulative length or duration. The mediacast generation system 116 (FIGS. 1 and 2) accommodates these differences in length or duration via buffering of the broadcast or Webcast programming 112 or portions thereof. This buffering is depicted on the buffering timeline 306.

While buffering is generally illustrated and described in the description as occurring at the mediacast generation system 116, such may occur elsewhere (e.g., CDN 122, mediacast content consumer 114). The buffering timeline 306 represents only one example of a sequence of content segments. In some implementations a difference sequence of content segments may occur. For example, a replaceable or non-replaceable non-programming content segment may occur immediately following a non-replaceable programming content segment. Also for example, some types of content segments may not occur and/or other types of content segments may occur. Based on the description herein, a skilled artisan will be able to apply the general principles described herein to sequences of content segments other than that specifically illustrated in FIG. 3.

Point 308 represents a point in time where the broadcast programming 302 and the mediacast 304 are in time synchronization $T_B=T_M=0$.

At time $T_B=T_M=0$, content information 314a (e.g., image content data) indicating the beginning of a replaceable non-programming content segment is detected in the broadcast programming 302. The broadcaster 102 (FIG. 1) provides 1:20 of replaceable non-programming content segment 318. The replaceable non-programming content segment 318 may, for example, consist of a plurality of advertisements or commercials.

While the broadcaster 102 broadcasts the 1:20 of replaceable non-programming content segment 318 to the broadcast content consumers 106 (FIG. 1), the mediacast generation system 116 substitutes a first replacement non-programming content segment 320A into the mediacast 304. The first replacement non-programming content segment 320A may, for example, consist of a first advertisement or commercial, which is likely different from the advertisements or commercials of the broadcast programming 302.

Having not detected content information indicating the beginning of a non-replaceable content segment prior to the end of the first replacement non-programming content segment 320A, the mediacast generation system 116 substitutes a second replacement non-programming content segment 320B into the mediacast 304.

Again, having not detected content information indicating the beginning of a non-replaceable content segment prior to the end of the second replacement non-programming content segment 320B, the mediacast generation system 116 substitutes a third replacement non-programming content segment 320C into the mediacast 304.

Prior to reaching the end of the third replacement non-programming content segment 320C, the mediacast generation system 116 (e.g., monitor 202) detects content information 322a indicating the start of a replaceable programming content segment 324, for example at 1:20 in the broadcast programming 202. The mediacast generation system 116 continues to substitute the third replacement non-programming content segment 320C until its end is reached, at 1:25.

Once the end of the third replacement non-programming content segment 320C is reached, at 1:25, the mediacast generation system 116 substitutes replacement programming content segments 326 to form the mediacast 304. Thus, two conditions had to be satisfied, the first being that content information (e.g., image content data) indicated that a replaceable portion of the broadcast programming 302 had been reached, and the second being that the current content segment being substituted or inserted has finished.

In this example, the broadcaster 102 (FIG. 1) transmits 0:50 of replaceable programming content 324 to the broadcast content consumers 114 (FIG. 1). The replaceable programming content 324 may, for example, consist of a plurality of news segments on the broadcaster's playlist or which are consistent with the broadcaster's topics. While the illustrated example uses certain periods, actual implementations will of course use different periods. For example, replaceable content segments may, for instance, include blocks of three to six news segments, which may average 2:30, or some other duration. Thus, the total replaceable programming content period may, for example be between 10 and 15 minutes, rather than the much more abbreviated period (0:50) illustrated.

While the broadcaster 112 (FIG. 1) broadcasts replaceable programming content 324, the mediacast generation system 116 substitutes a first replacement programming content segment 326D to generate the mediacast 304. The first replacement programming content segment 326D may, for example, take the form of a news segment, likely different from the news segments of the replaceable programming content 324.

Having not detected content information indicating the beginning of a non-replaceable content segment prior to the end of the replacement programming content segment 326D, the mediacast generation system 116 substitutes a second replacement programming content segment 326E to generate the mediacast 304. The second replacement programming content segment 326E may, for example, take the form of a news segment, likely different from the news segments of the replaceable programming content 324.

Again, having not detected content information indicating the beginning of a non-replaceable content segment prior to the end of the second replacement programming content segment 326E, the mediacast generation system 116 substitutes a third replacement programming content segment 326F to generate the mediacast 118 (FIG. 1).

Prior to reaching the end of the third replacement programming content segment 326F, the mediacast generation system 116 (e.g., monitor) detects content information 328a indicating the start of a non-replaceable programming content segment 330, at 2:10 in the broadcast programming 302. The mediacast generation system 116 continues to substitute the third replacement non-programming content segment 326F until its end is reached, at 2:30, The non-replaceable programming content segment 330 is an important part of the broadcast, so it cannot be lost. The non-replaceable programming content segment 330 may, for example, comprise news, sports, weather, or traffic reporting, announcer or host discussions, or other content that would be relevant to a wider, geographically diverse audience. Since the non-replaceable programming content segment 330 is marked or identified as being non-replaceable, and since the start of the non-replaceable programming content segment 330 is detected before the mediacast generation system 116 is finished with the third replacement programming content segment 326F, the mediacast generation system 116 starts buffering the non-replaceable programming content segment 330 at 2:10 in the broadcast programming 302. Such is indicated by the gradually increasing slope 327a of buffer time line 306.

Once the end of the third replacement non-programming content segment 326F is reached, at 2:30, the mediacast generation system 116 starts transferring the buffered content from the buffer 206 (FIG. 2) as non-replaceable programming content segment 332 to generate the mediacast 304. At the same time, the mediacast generation system 116 continues to buffer incoming portions of the non-replaceable programming content segment 330 to the buffer 206 (FIG. 2). Thus, the buffer 206 is playing off a front end, while storing to the back end, in a queue like fashion. This is indicated by the essentially flat portion 327b of the buffer time line 306, which assumes the incoming content arrives at the same rate as the outgoing content. Such may or may not be the case in any particular implementation, and may even vary from time to time in a single implementation.

Notably, the non-replaceable programming content segment 332 portion of the mediacast 304 lags the corresponding non-replaceable programming content segment 330 portion of the broadcast programming 302 by 0:20. However, this asynchronicity between the broadcast programming 302 and the mediacast 304 is unnoticed by either the mediacast content consumer 114 (FIG. 1) due to the seamless substitution or insertion of the replacement programming and non-programming content by the mediacast generation system 116.

At 3:25, the mediacast generation system detects content information 334a in the broadcast programming 302, which is indicative of the start of a replaceable programming content segment 336 in the broadcast programming 302. The mediacast generation system 116 (FIG. 1) continues playing out of the buffer 206 (FIG. 2) until all of the non-replaceable programming content segment 332 has been incorporated into the mediacast 304, at 3:45. This is illustrated as gradually decreasing slope 327c of the buffer time line 306. This empties the last 20 seconds of the buffer, which cuts into the replaceable programming content segment 336 effectively shortening such.

In this illustration, the broadcaster 102a (FIG. 1) transmits 1:15 of replaceable programming content 336 to the broadcast content consumers 106 (FIG. 1). Once the non-replaceable programming content segment 330 has been played from the buffer, the mediacast generation system 116 (FIG. 1) substitutes a first replacement programming content segment 338G to generate the mediacast 304. The first replacement programming content segment 338G may, for example, consist of a news segment, likely different from the news segments of the replaceable programming content 336.

Having not detected content information indicating the beginning of a non-replaceable content segment prior to the end of the first replacement programming content segment 338G, the mediacast generation system 116 (FIG. 1) substitutes a second replacement programming content segment 338H to generate the mediacast 304. The second replacement programming content segment 338H may, for example, consist of a news segment.

Again, having not content information indicating the beginning of a non-replaceable content segment prior to the end of the replacement programming content segment 338H, the mediacast generation system 116 (FIG. 1) substitutes a third replacement programming content segment 338I into the mediacast 304.

Prior to reaching the end of the third replacement programming content segment 338I, the mediacast generation system 116 (FIG. 1) detects content information 340a, indicating a start of a replaceable non-programming content segment 342 at 4:40 in the broadcast programming 302. The replaceable non-programming content segment 342 may, for example, comprise a number of advertisements or commercials. The illustrated replaceable non-programming content segment 342 is 1:00 minute in length or duration.

Notably, the replacement non-programming content segment 338I ends 0:10 after the mediacast generation system 116 detects the content information 340a. Recall that the total asynchronicity was 0:20 prior to the current segment. Thus, the asynchronicity has been reduced by 0:10. This occurs inherently through the buffering of certain broadcast programming content which is triggered by detection of content information (e.g., image content data), and the unbuffering of buffered content which is triggered by two conditions, that is the occurrence of a next content segment in the broadcast programming, which is indicated by detection of appropriate content information, and the completion of the substitution of the current replacement content. It can be seen that the system advantageously is able to thereby manage the buffering of broadcast programming content for each of the mediacasts 304 without requiring knowledge of the duration of the replaceable segment within the broadcast programming 302 or knowledge of the duration of the replacement segments used to generate each mediacast 304.

At 4:50 mediacast generation system 116 (FIG. 1) detects content information 340b, which indicates the end or completion of the third replacement programming content segment 338I. In response, the mediacast generation system 116 (FIG. 1) substitutes a first replacement non-programming content segment 344J to generate the mediacast 304.

Having not detected content information indicating the beginning of a non-replaceable content segment prior to the end of the first replacement programming content segment 344J, the mediacast generation system 116 (FIG. 1) substitutes a second replacement non-programming content segment 344K to generate the mediacast 304.

Prior to reaching the end of the second replacement non-programming content segment 344K, the mediacast generation system 116 (FIG. 1) detects content information 348a, indicating the start of a non-replaceable programming content segment 350 at 5:40 in the broadcast programming 302. The mediacast generation system 116 (FIG. 1) continues to substitute the replacement programming content segment 344K until the replacement programming content segment 344K is complete. During this time mediacast generation system 116 (FIG. 1) buffers the non-replaceable programming content segment 350. Such is indicated by the gradually increasing slope 351a of the buffer time line 306. Notably, two conditions had to be satisfied to trigger the buffering, that is 1) detection of non-replaceable content; and 2) an uncompleted substitution of replacement content.

The mediacast generation system 116 (FIG. 1) detects content information 348b, indicating the replacement programming content segment 344K is complete. This occurs at 5:45, 0:05 after the detection of the content information 348a. In response, the mediacast generation system 116 (FIG. 1) begins unbuffering or playing or transferring the buffered content out of the buffer 206 (FIG. 2) to generate the mediacast 304. Meanwhile, the mediacast generation system 116 (FIG. 1) continues to buffer portions of the non-replaceable programming content segment 350 as those portions arrive. This simultaneous buffer and unbuffering is illustrated as a flat portion 351b of the buffer time line 306.

Recall that the total asynchronicity was 0:10 prior to the current segment. Thus, the asynchronicity has been reduced by 0:05 to 0:05. The non-replaceable programming content segment 352 portion of the mediacast 304 lags the corresponding non-replaceable programming content segment 350 portion of the broadcast programming 302 by 0:05.

The mediacast generation system 116 (FIG. 1) detects content information 356a which is indicative of a start of a replaceable non-programming content segment 358, at 6:50. The replaceable non-programming content segment 358 may, for example, take the form of one or more advertisements or commercials. The replaceable non-programming content segment 358 is illustrated as having a length or duration of 1:00 minute. During this time, the mediacast generation system 116 (FIG. 1) is emptying the remaining buffered content, illustrated by the gradually decreasing slope 351c of the buffer time line 306.

The mediacast generation system 116 (FIG. 1) detects content information 356b which indicates an end of the unbuffering or playing out of the buffered non-replaceable programming content segment 350. In response, the mediacast generation system 116 (FIG. 1) substitutes a first replacement programming content segment 360L to generate the mediacast 304. The first replacement programming content segment 360L may, for example, comprises one or more news segments. Thus, in contrast to previous substitutions or replacements, in this instance one type of content (i.e., non-programming content) is being replaced by a different type of content (i.e., programming content).

Having not detected content information indicating the beginning of a non-replaceable content segment prior to the end of the first replacement programming content segment 360L, the mediacast generation system 116 (FIG. 1) substitutes a second replacement programming content segment 360M to generate the mediacast 304. The second replacement programming content segment 360M may, for example, comprise one or more news segments. Thus, in contrast to previous substitutions or replacements, in this instance one type of content (i.e., non-programming content) is being replaced by a different type of content (i.e., programming content).

Again, having not detected content information indicating the beginning of a non-replaceable content segment prior to the end of the replacement programming content segment 360M, the mediacast generation system 116 (FIG. 1) substitutes a third replacement programming content segment 360N to generate the mediacast 304. The third replacement programming content segment 360N may, for example, comprise one or more news segments. Thus, in contrast to previous substitutions or replacements, in this instance one type of content (i.e., non-programming content) is being replaced by a different type of content (i.e., programming content).

Prior to reaching the end of the third replacement programming content segment 360N, the mediacast generation system 116 (e.g., monitor 202) detects content information 362a indicating the start of another segment at 7:50 in the broadcast programming 302. The third replacement non-programming content segment 360N ends 0:10 after the mediacast generation system 116 (FIG. 1) detects content information 362a. Thus, the current asynchronicity (i.e., the duration of the original broadcast being buffered) is 0:05.

As illustrated above, the mediacast generation system 116 may inherently fluctuate around a certain asynchronicity between the broadcast programming 302 and the mediacast 304. This advantageously prevents accumulation of large amounts of asynchronicity over time. This inherent tendency to self-adjust is, at least in part, a result of requiring two conditions to be satisfied before substituting or inserting replacement content, 1) detected content information indicates that a replaceable portion of the broadcast programming 302 had been reached, and 2) the current content segment being substituted or inserted has finished. This allows buffered content to be played out, and a following replaceable content segment be automatically shortened to reduce the asynchronicity, even without any knowledge or concern about the length of the individual pieces of content being substituted during the replaceable content segment. Such provides a particularly elegant solution, allowing complete freedom in content selection, while inherently limiting cumulative asynchronicity. Both replaceable programming and replaceable non-programming segments may be used to reduce the asynchronicity.

It may be desirable to ensure that some content segments are not reduced in duration or length. For example, replaceable non-programming content segments may be used to run advertisements or commercials. Reduction of the duration of such may reduce revenue opportunity for a broadcaster or Webcaster 102. Thus, in some implementations some of replaceable segments are not used to reduce asynchronicity. In such implementations the mediacast generation system 116 may extend a length or duration of a replacement content segment sufficiently to assure that such is at least as long as a length or duration of the corresponding content segment in the broadcast or Webcast. In some instance, the replacement content segment will be longer, for example where a piece of replacement content must be completely played out so extends the transition to non-replaceable content. Other replaceable content segments (e.g., replaceable programming content segments) may be used to reduce asynchronicity. Such may even be implemented dynamically. For example, the mediacast generation system 116 determines whether an asynchronicity exceeds some threshold value. If the asynchronicity does not exceed the threshold value, the mediacast generation system 116 lengthens the replacement content segment in the mediacast to ensure it is at least as long as the corresponding replaceable content segment in the broadcast programming. If the asynchronicity does exceed the threshold value, the mediacast generation system 116 uses the replacement content segment in the mediacast to reduce the asynchronicity between the mediacast and the broadcast programming.

Further, as used herein and in the claims, the term substitute and variations of such are not limited to one-for-one substitutions, but generally refer to a partial or even total replacement of some content for some other content to generate the mediacast 118 (FIG. 1).

Specific Examples of Operation

Figure 4:
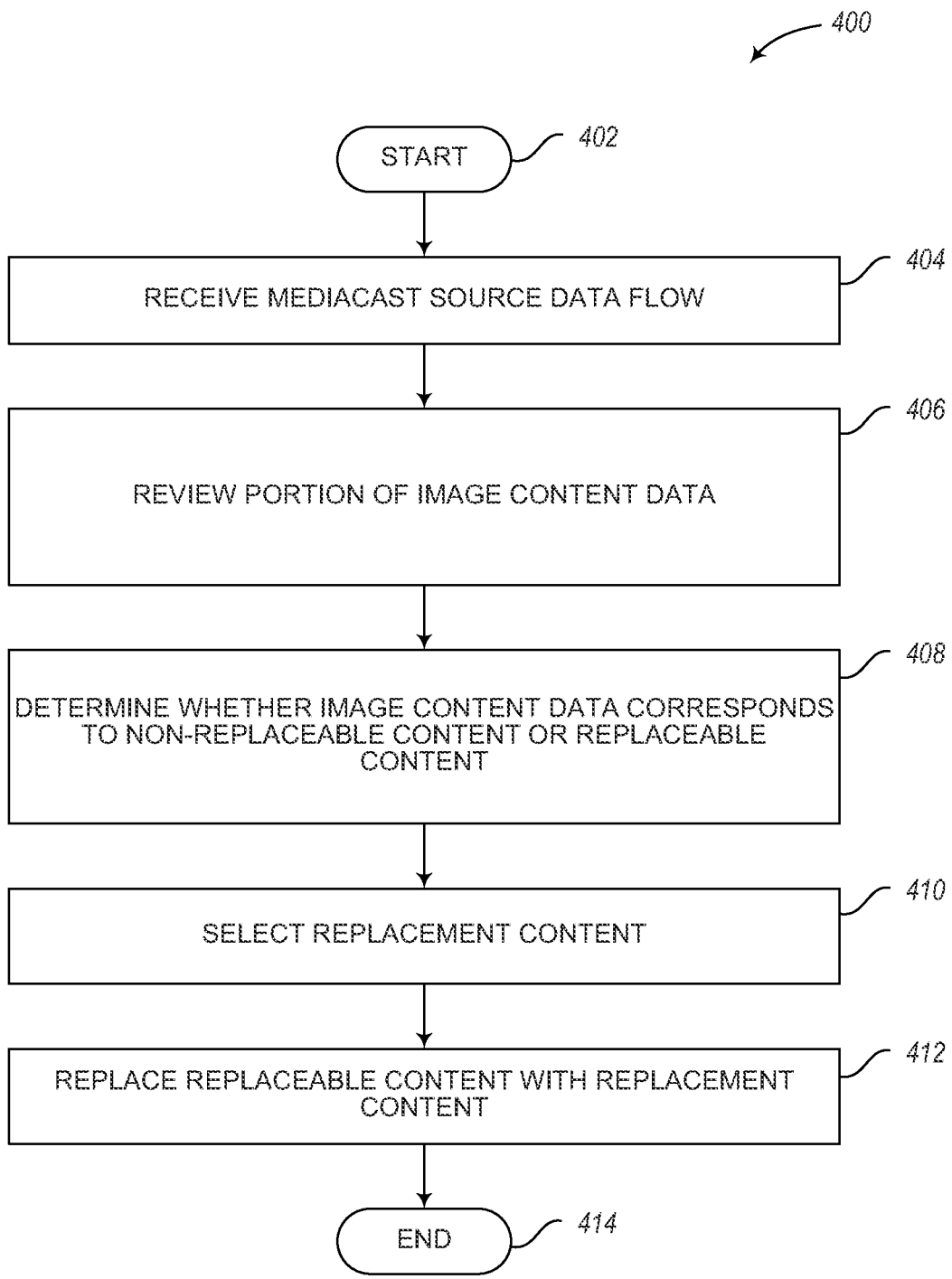
FIG. 4 shows a method of operating a mediacast generation system to provide a plurality of mediacasts to a respective plurality of mediacast content consumers in a networked environment, according to one illustrated embodiment.

FIG. 4 shows a method 400 of operating one or more components of a mediacast generation system to provide mediacasts 118 (FIG. 1) to mediacast content consumers 114 in a networked environment 100, according to one illustrated embodiment. The method 400 starts at 402.

At 404, the mediacast generation system 116 (FIG. 1) receives the original broadcast or Webcast programming 112. The original broadcast or Webcast programming 112 typically includes sequential replaceable and non-replaceable content segments, which may appear in any order. For example, local or regional advertising content contained within the original broadcast or Webcast programming 112 may considered replaceable content while the primary subject matter, content or entertainment within the original broadcast or Webcast programming 112 may be considered non-replaceable content segments. Such may be identified by the content detection methods discussed below.

At 406, the mediacast generation system 116 (FIG. 1) reviews or analyzes at least a portion of the image content data of the original broadcast or Webcast programming 112. As discussed in further detail below, image content data may be reviewed or analyzed to extract one or more properties of the content segments of the broadcast or Webcast programming 112. For example, the portion of the image content data may be analyzed to detect a start and/or end of a content segment and/or a duration thereof. The image content data may also be analyzed to determine whether a given content segment is programming content (e.g., a news segment) or non-programming content (e.g., advertisements). Thus, analyzed image content data may be used to determine whether a given content segment is 1) replaceable programming content, 2) non-replaceable programming content, 3) replaceable non-programming content, or 4) non-replaceable non-programming content.

At 408, the mediacast generation system 116 (FIG. 1) determines whether the analyzed image content data for one or more content segments in the broadcast or Webcast programming 112 is replaceable or non-replaceable. Non-replaceable content is typically content that is important to the broadcast. Such may, for example, include news, sports reports, host commentary, etc. Notably, this act or operation does not need to distinguish between programming content and non-programming content since the mediacast generation system 116 may treat both in the same manner, so long as the content is considered non-replaceable.

If the mediacast generation system 116 determines at 408 that the content segment is replaceable, then the mediacast generation system 116 (FIG. 1) selects replacement content at 410. At 412, the mediacast generation system 116 replaces the replaceable content segments with the selected one or more replacement content segments.

The process 400 may terminate at 414 until called again, or may continually repeat. Alternatively, the process 400 may run concurrently with other methods or processes, for example, as one of multiple threads on a multi-threaded processor system.

While not illustrated in FIG. 4, the mediacast generation system 116 may optionally dynamically generate, or cause to be generated, a respective manifest for each request for a mediacast. The mediacast generation system 116 may additionally or alternatively, optionally fragment or cause to be fragmented the content constituting the mediacast. The mediacast generation system 116 may additionally or alternatively, optionally cause the fragments to be cached, for example by one or more CDNs 122 (FIG. 1).

Specific Examples of Video Content Type Identification

After analyzing numerous video mediacasts from a variety of mediacast sources, clues for detecting content events, such as content type transitions, or detecting program-in-progress specific metadata, were identified. These clues, or "primary elements," generally occur in the form of recurring patterns of media content data (of any media content type) that are explicitly defined and represented within the mediacast content itself, as opposed to metadata or markers. As discussed further herein, these primary elements may be used to either identify an active program state or content type (e.g., programming content, advertising content, etc.), or to represent a type of information marker that contributes some information about mediacast content.

In addition to explicit clues or primary elements, representations that are more abstract may be utilized. For example, implicitly defined primary elements may be primary elements that are configured to detect patterns that occur within the temporal domain of one or more event or state transitions, or as an algorithmic processing method extracted from the content data available. For example, implicitly defined primary elements may be used to detect the occurrence of timing patterns that manifest by measuring the timing between events or state changes exhibited by a group of the more concrete explicit primary elements. Another example of an implicitly defined primary element is an element that uses input data that is synthetically generated, such as the texting the color average or intensity of a video element, finding edges in a video element, or other derived data sources. Generally, an implicit defined element is one that has no literal data representation originating from the mediacast source data flow.

Figure 6:
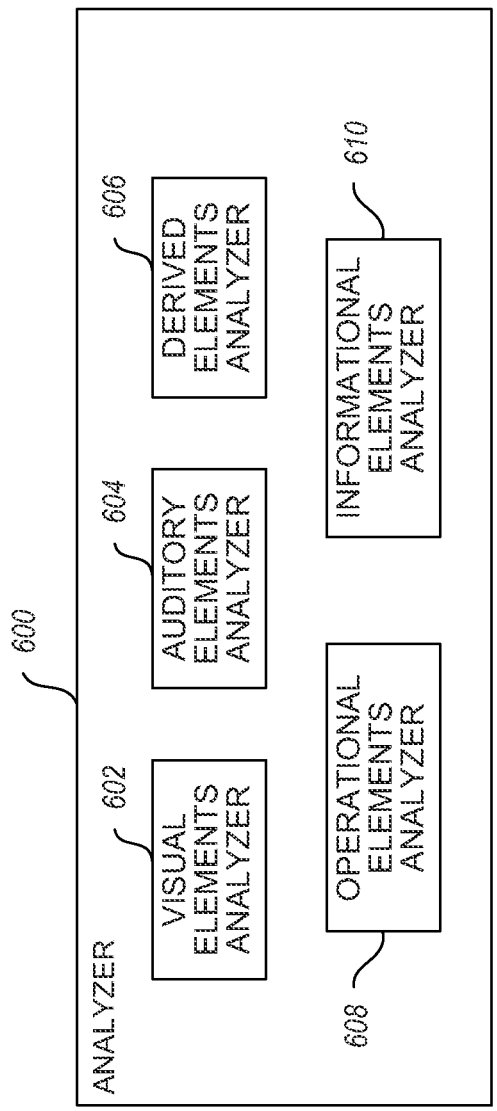
FIG. 6 is a schematic diagram of an analyzer of a mediacast content detection system that includes a number of analyzers for various element types.

Both implicit and explicit elements may be further broken down into more specific categories that represent the media types and processing capabilities generally needed to allow analysis of the element to produce an output state transition event. FIG. 6 illustrates an analyzer module 600 that includes analyzers for five exemplary types of elements. In particular, the analyzer module 600 includes a visual elements analyzer 602 to analyze visual elements, and auditory elements analyzer 604 to analyze auditory elements, a derived elements analyzer 606 to analyze derived elements, and operational elements analyzer 608 to analyze operational elements, and an informational elements analyzer 610 to analyze informational elements. Each of these example element types is discussed below. It should be appreciated that the number of element types that may be available for detection operations is practically unlimited.

The visual elements analyzer 602 may be used to analyze visual elements. Visual elements are explicit data sources that are derived from capturing rendered image content data or any rendered collection of pixels which appear within the boundaries of the rendered surface or viewer frame of a video mediacast. Visual elements may consist of the entire display size or rendered surface, or they may be smaller, preconfigured areas (e.g., rectangular areas) contained within the rendering surface boundaries. These preconfigured areas are referred to herein as detection regions, or simply "regions." Visual elements may include graphical, non-textual elements, graphical textual elements, or graphical elements that include textual and non-textual elements.

Detection regions (see FIG. 9) may be utilized as a tool for partitioning areas contained within a viewer frame into independent areas of image content data. Detection regions also allow for the use of multiple areas of the viewer frame to be input factors in an overall detection scheme. These areas of the viewer frame may be predetermined or identified automatically or by an administrator or content producer as having a high probability that the areas will at some point contain informative visual elements or clues about the program state of the mediacast source data flow. By only analyzing to detection regions with a high probability of informative visual elements, as opposed to analyzing the entire viewer frame, the speed and accuracy of visual analysis is dramatically increased. However, the systems and methods described herein may also define and analyze detection regions that represent the entire viewer frame.

Detection regions may be used as a defining area for any type of image analyzer including the visual elements analyzer 602, the operational elements analyzer 608, and the derived elements analyzer 606. Further, the number of active detection regions linked to a particular element analyzer is virtually unlimited. Detection regions may be stacked, overlapped, coupled together, separated, or may be independent of each other.

The detection regions may be modified as needed. For example if the visual element analyzer 602 is configured to detect a visual element that was located at a previously configured detection region, and the visual element is modified, skewed, or shifted by the mediacast content producer, the detection system allows for an administrator to adjust the defined region with an interactive, real-time transformation to provide a rapid reconfiguration of the visual element analyzer 602. As another example, if the location of a detection region's top-left origin shifts in any direction, or of the scale of the detection region and the mediacast source data flow is increased or decreased, an administrator may modify the detection region's geometric properties in real-time to compensate for the changes, and store the modified detection region's reconfigured property data, without the need to create a new detection region and visual element analyzer 602.

The auditory elements analyzer 604 may be used to analyze auditory elements. Auditory elements may be any number of audio channels that include audio content data which are explicitly contained within the content of the mediacast source data flow.

The derived elements analyzer 606 may be used to analyze derived elements. Generally, a derived element is an implicitly defined element type which operates on synthetically generated data. Thus, synthetically generated data may be provided by one or more primary elements, including other implicit data sources. Data provided to the derived element analyzer 606 may be combined, modified, or otherwise synthesized to be utilized in the detection process. A basic example of the derived element is an element defined by a derived element analyzer that receives one or more explicit visual elements as inputs, and returns a positive state transition if at least one of the visual elements contains a blue pixel. Optionally, the derived element analyzer 606 may also create a newly created synthetic visual element and forward the element directly to subsequent detection stages that may be configured to receive outputs of the derived element analyzer 606. As another example, the derived element analyzer 606 could be used to output new synthetic image data which is a composite image generated by mixing only blue pixels from each of a number of visual elements coupled to the derived element analyzer's inputs.

Another example of a derived element is one defined by a derived element analyzer 606 that returns a positive state transition only if one of its inputs contains a visual element consisting of pure black (or extremely low color intensity), and an auditory element, placed at a another one of its inputs, that when analyzed is determined to be silent. This derived element analyzer 606 may be referred to as a "nothingness detector," which may be useful to detect content type state transitions (e.g., transitions between a programming content segment and an advertising content segment).

The operational elements analyzer 608 may be used to analyze operational elements. Generally, operational elements are an implicit element type that allow for more advanced detection methods and analysis. Operational elements often represent a linear sequence of discrete state change events that may be analyzed by ensuring an accurate predefined ordering of each occurrence, and or by measuring the timing between state change events. Operational elements may be configured to detect and analyze how and when mediacast sources and content providers utilize the artistic and technical production nuances put in place to transition to and from individual program states. For example, when a mediacast source or content provider begins a transition into and out of advertising content types or programming content types, they may present a standard pattern of events that may be used to signal the potential timing of an upcoming state change. The operational element analyzer 608 operates in such a way that the completion of a predefined sequence chain invokes its transition to a positive analysis state.

Mediacast sources and content providers often automate an event chain for transitioning to different programming types, or for indicating new temporal boundaries for a video content segment with starting and stopping points. The systems and methods described herein may be used to detect such event chains. For example, the operational elements analyzer 608 may detect that auditory elements are significantly below a typical average, indicating a period of silence. The operational elements analyzer 608 may also determine that the average color intensity for each rendered video element has begun to decrease steadily to lower color intensity levels. The operational elements analyzer 608 may further detect that color intensity levels have reached black level, and have been sustained at that level for at least a number of video frames (e.g., five video frames) while the auditory elements are maintained in a state of silence. Given these inputs, the operational elements analyzer 608 may transition its output state to a positive analysis result, indicating a transition has been detected.

As can be appreciated, the timing accuracy of the operational element analyzer 608 is generally dependent on the refresh rate of the primary elements being analyzed. As discussed in further detail below, this timing accuracy may be improved by the use of more advanced techniques that utilize temporal shifting.

The informational elements analyzer 610 may be used analyzed informational elements. Informational elements are elements that are established to provide status, as opposed to content type triggering systems. For example, a visual element may be used by an informational element analyzer 610 to detect an image or logo that identifies a specific program. Rather than contributing to content type determination, this informational element analyzer 610 may simply output metadata identifying the name of the program or other characteristic of the program.

Figure 7:
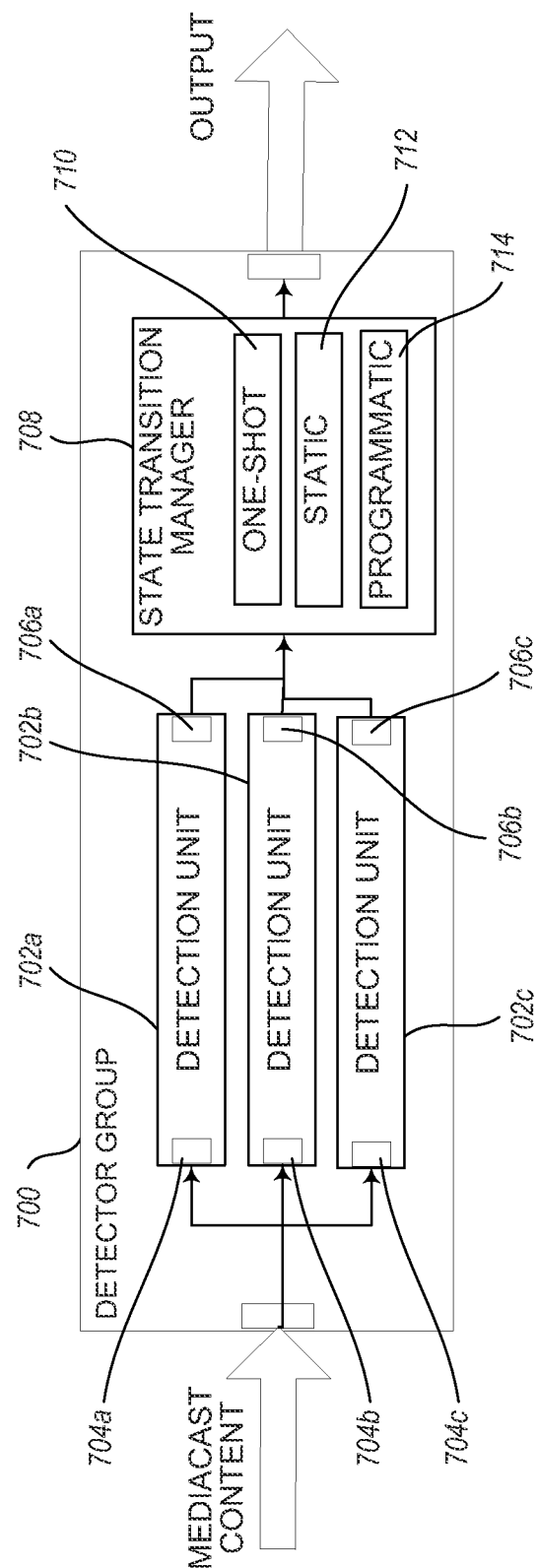
FIG. 7 is a schematic diagram of a detector group of a mediacast content detection system, according to one illustrated embodiment.

FIG. 7 illustrates an example of a detector group module 700, or "detector group," which may be a component of the analyzer 600 of FIG. 6, or may implement one or more components of the analyzer 600. A detector group 700 is a processing unit that contains within it a number of detection units 702 arranged and at least one detection/analyzer stage. In the illustrated embodiment, the detector group 700 includes three detection units 702*a*, 702*b*, and 702*c* arranged in a single, parallel detection/analyzer stage. Each of the detection units 702*a*, 702*b*, and 702*c* include an input sink interface 704*a*, 704*b*, and 704*c* configured to receive one or more types of data and an output source interface 706*a*, 706*b*, and 706*c* configured to provide output data to components coupled thereto downstream. A primary role of the detector group 700 is to consolidate the collection of input sink interfaces required by a first stage of detection units 702 encapsulated by the detector group into singular shared input sink pathways, aggregated by commonly shared input element types. A detector group 700 may include multiple stages of detection units 702 that are configured in a chain like pathway. A detector group also provides encapsulation of advanced detection unit arrangements, initialization data, and output determination logic, in a reusable, persistently stored data file (e.g., the nontransitory computer- or processor-readable medium 210 of FIG. 2).

When a primary element is encapsulated, referenced, or generally assigned to an instantiated analyzer object (FIG. 6), the resulting system is a detection unit 702. The fundamental operation of a detection unit 702 is to receive an input element provided to one of its input sink interfaces 704, perform an analysis on that input element, and return a result of the analysis to one or more output source interfaces 706. Generally, a detection unit 702 should be equipped with at least one output source interface 706 that passes the results of the analysis to another component to provide useful information.

The output source interfaces 706 of the detection units 702 may also be configured to provide additional information about the state of the detection units 702. These information output types are optional, but may be a valuable source of information for inspecting analysis results. A detection unit 702 may be equipped with any number of input sink interfaces 704 capable of handling any number of element types needed to perform its analysis routines.

The analysis performed by a detection unit 702 may typically be activated on the presence of elements or triggering events at its input sink interfaces 704. However, the input sink interfaces 704 are not required to be present to activate the analysis by the detection units 702. As an example, any method of invocation may be performed by logic directly defined by the system source code or defined by code libraries triggering the invocation by, for example, utilizing a system software development kit (SDK).

The detection units 702 may also be preloaded with reusable and persistent initialization and configuration data that may be required to function properly with a particular mediacast source. This initialization and configuration data may represent trigger patterns the detection unit 702 is expecting to encounter, as well as other set up information, such as output triggering modes (discussed below). Examples of possible detection unit initialization and configuration data are discussed below.

One example of initialization and configuration data for a detection unit 702 is an allowed margin of error. For example, if a detection unit 702 is configured to compare pixels for analyzing a source image and an expected target image, and allowed margin of error may define the maximum amount of color deviation allowed between the two images before it is determined to be a failed detection. In this example, the allowed margin of error may be independently established for each color plane available (RGB).

Another example of initialization and configuration data for a detection unit 702 is a gated (minimum/maximum) time span allowed between output state transitions. For example, if a detection unit 702 encounters bursts of erratic output state transitions that would violate a configured gated time span allowed between output state transitions, the detected output state transitions may be ignored until a detected state transition attempt occurs within the valid configured gated time span.

Another example of initialization and configuration data for a detection unit 702 includes manually defined metadata information. For example, metadata information could be a visual element containing an image of a specific program title logo that is detected by an informational element analyzer 610 (FIG. 6). The title of this program may be logically bound to this detection unit 702 as a metadata property. When the detection unit 702 transitions its output state due to a positive detection, the extra metadata information logically bound to the detection unit may be appended onto the state data, which may then be passed along to the next stage in the detection system.

The detection units 702 may also be associated with triggering mode data for the detection units' various output source interfaces 706. The triggering modes for the detection units 702 are discussed below. In general, any custom initialization or configuration data needed to operate the detection units 702 properly may be utilized.

The detector group 702 also includes a state transition manager 708, which may also be referred to as a trigger machine. In some embodiments, an output of a detector group 700 may be coupled directly to an input sink interface of another detector group rather than being coupled to a state transition manager.

In the basic modes of element detection, if an anticipated primary element is approved as a hit or match in the analyzer routines which encapsulate the predefined expected data pattern within a detection region, the positive result determined by data analysis routines of the detection unit instruct the output source interface 706 of the detection unit 702 to transition to an active state. Conversely, if the anticipated primary element disappears from the active detection region, the detection unit 702 transitions to a non-active output state.

The use of elements is not limited to the detection of program state at the most current rendering time. In some embodiments, elements are incorporated by groups of detection units 702 that are equipped with prefigured information used to determine when a particular triggering event might have happened in the past. While a sequence of events that determine where a triggering event occurred after it has passed through the analyzers is not useful for real-time playback, the mediacast generation system 116 may time shift or delay the mediacast content playback to allow the system to reach backwards in time and place a trigger before the content exits the system on its way to a playback device. These types of detection units 702 are also valuable because they allow for more advanced analysis since there is less time pressure placed on detection units relative to the case where a real-time decision is required.

At its most fundamental level, the inputs and outputs of the state transition manager 708 are bound to rules and function space defined by Boolean logic state machines. A detection unit 702 or detector group 700 is not limited to a single state transition manager 708. State transition managers 708 may be chained together, forming a decision tree of state determination. Further, while functionality of the state transition manager 708 may be standard Boolean operators (AND, OR, NAND, NOR, etc.), state transition managers may be constructed in a way that allows more complex state determinations.

As shown in FIG. 7, the state transition manager 708 includes three types of output state firing modes: one shot mode 710, static mode 712, and programmatic mode 714. One-shot firing mode 710 is a firing mode wherein the state transition manager 708 changes its state only at the time when its input and/or internal logic algorithms make a state transition. This type of firing mode is utilized as an event driver to notify a downstream entity that a state transition has occurred. The static firing mode 712 is a firing mode wherein the state transition manager 708 maintains it output state indefinitely based on its input states and internal logic. Programmatic firing modes 714 are firing modes other than the one-shot mode 710 and the static mode 712 that may be programmed and implemented by the mediacast generation system 116 (FIG. 1). Programmatic firing modes 714 may be added to the system at any point, for example, using standard plug-in methods. This allows for the operation of state transition managers 708 with firing modes that are determined by whatever logic is desired.

Figure 8:
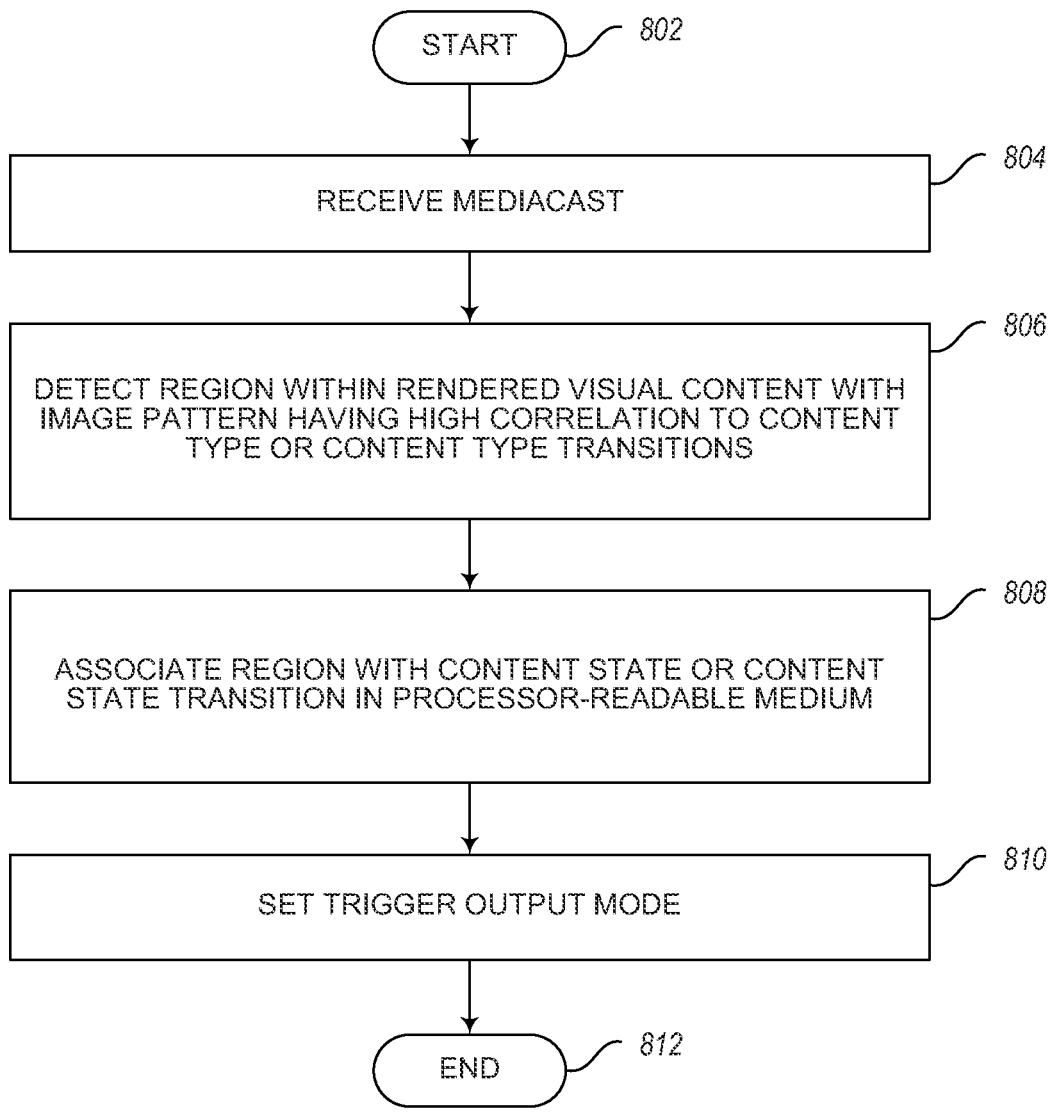
FIG. 8 shows a method of operating a mediacast content detection system to determine detection regions usable by the mediacast content system to detect a characteristic of one or more video content segments, according to one illustrated embodiment.

FIG. 8 illustrates a high level flow diagram of a method 800 for determining video elements that may be used to detect content type, state transitions, or other characteristics about video content. The method 800 begins at 802. At 804, the mediacast generation system 116 (FIG. 1) receives mediacast programming 112. The mediacast programming 112 typically includes sequential replaceable and non-replaceable content segments, which may appear in any order.

At 806, the mediacast generation system 116 identifies candidates for visual detection regions by visually identifying regions within the rendered visual content that exhibit a strong, consistent correlation between content state or content type transitions and the appearance or disappearance of any equally occurring image pattern. At 808, the mediacast generation system 116 associates the identified detection regions with their corresponding content states or content type transitions in a nontransitory processor-readable medium.

At 810, the mediacast generation system 116 sets the type of trigger output mode or firing mode. For example, if the appearance of the rendered image pattern tends to appear near the start of new content types and then remained present for the duration of the content segment, the rendered image pattern requires a static detection unit having a static output firing mode 712. An example rendered image pattern that is detectable using a static visual detection unit is a content provider identifier tag (hereinafter "ID tag") used by many content providers (e.g., CNN, ESPN, etc.) to identify the source of the content (see FIG. 9).

If the appearance of the rendered image pattern tends to appear only near the start of a new content type or only at the end of content segments, but disappears after a set amount of time, the rendered image pattern may necessitate a one-shot visual detection unit that utilizes the one-shot firing mode 710. One-shot visual detection units can only provide useful state information at the actual state transition of the detection unit's output. As can be appreciated, one-shot visual detection units may utilize a set/reset trigger machine to provide the logic required to generate a proper steady-state output value.

The process 800 may terminate at 812 until called again, or may continually repeat. Alternatively, the process 800 may run concurrently with other methods or processes, for example, as one of multiple threads on a multi-threaded processor system.

Figure 9:
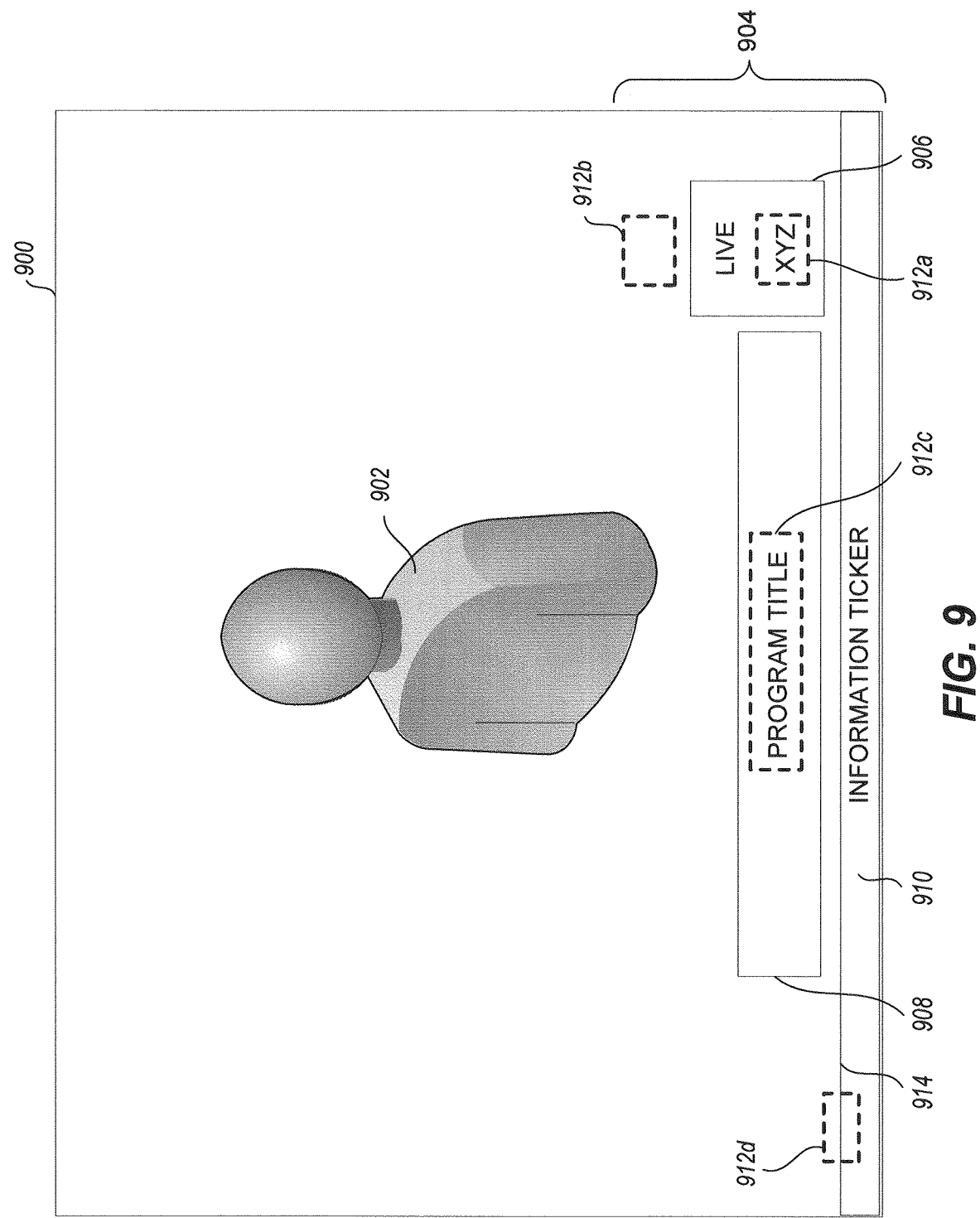
FIG. 9 is a rendered video frame of a mediacast source data flow depicting a plurality of detection regions usable by a mediacast content detection system to detect a characteristic of one or more video content segments, according to one illustrated embodiment.

FIG. 9 depicts a rendered image or video frame 900 of a mediacast source data flow. The rendered image 900 shows a person 902 (e.g., a newscaster) in the middle of the image. A lower third portion 904 of the video frame 900 includes an ID tag 906, a program title box 908, and an information ticker 910. In this example, the ID tag 906 identifies XYZ as the content provider and further includes the word "LIVE" to signify that the mediacast is being presented in real-time. The text and graphics typically presented in the lower third portion 904 of a video are often referred to as "lower thirds." Lower thirds may simply be text overlying the rendered video. Frequently this text is white with a drop shadow to make the words easier to read. A lower third can also contain graphical elements such as boxes, images or shading. Some lower thirds have animated backgrounds and text. Lower thirds are also often known as "CG" or captions, and sometimes chyrons, due to the popularity of a lower thirds rendering product made by Chyron Corporation. Another common term for lower thirds is superbars (or simply supers).

Content provider identification tags (ID tags), such as the ID tag 906, are generally the most prominent content identifying pattern based on visual elements. By being present in the content, these ID tags provide a reliable way to identify program content types. The majority of these ID tags have been found to be controlled by the content providers in an automated way, thus allowing for a certain expectation of reliability in the timing of their appearance and disappearance. Generally, the ID tags also remain somewhat static in their actual pixel representations and size, making detection methods more efficient. However, in some cases the ID tags may be relocated to other regions of the video display. In fact, the region of the video display in which a particular ID tag can be found may provide valuable state information to a detection unit 702 (FIG. 7). For example, the ID tag 906 shown in FIG. 9 that is in the lower third portion 904 of the video frame 900 may be a reliable indicator of whether the program content is live or is pre-recorded from an earlier time.

FIG. 9 also depicts four detection regions 912a, 912b, 912c, and 912d (collectively, detection regions 912) that are smaller preconfigured rectangular areas contained within the surface boundaries of the video frame 900. As discussed above, the detection regions 912 allow for partitioning areas contained within the video frame 900 into independent areas of image content data, as well as allow for the use of multiple areas of the video frame 900 to be input factors for one or more detection schemes. The locations of the detection regions 912 are generally locations predetermined or identified as having a high probability that they will at some point contain informative visual cues about the program state of the mediacast source. By only analyzing detection regions 912 with a relatively high probability of providing informative visual cues, the speed and accuracy of visual analysis methods may be increased. However, in some embodiments, detection regions 912 may be defined by the entire video frame 900.

In the embodiment shown in FIG. 9, predefined detection regions 912a and 912b are generated at locations where the ID tag 906 for XYZ is known to be found. It should be appreciated that in some embodiments numerous detection regions 912, including overlapping detection regions, may be used to provide input data for one or more detection schemes.

Figure 10:
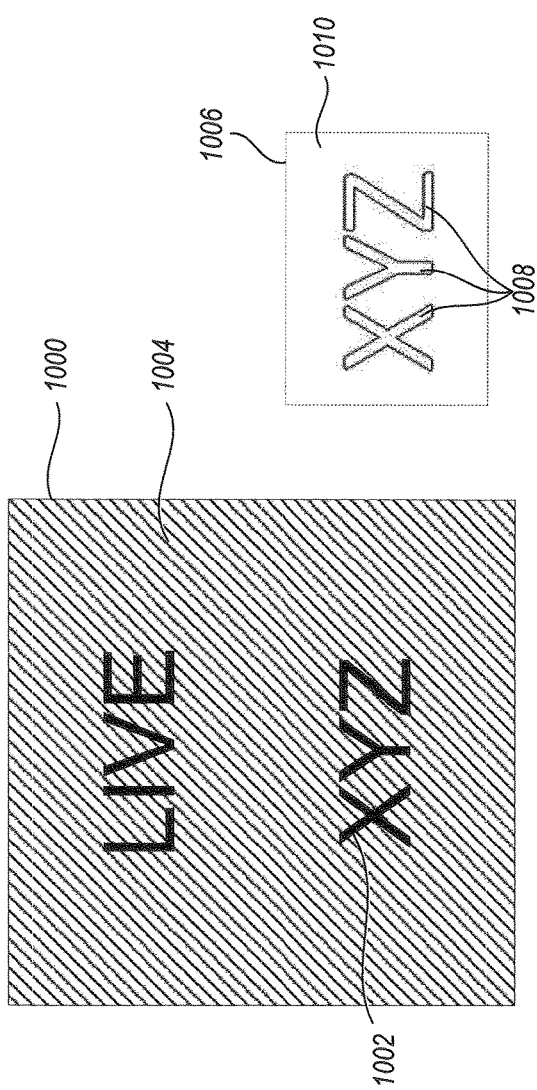
FIG. 10 is a schematic diagram of a rendered content provider identifier tag contained within a video content segment, and a detection region that includes mask usable by a mediacast content detection system to detect the content provider identifier tag to detect a characteristic of the video content segment, content provider identifier tag, according to one illustrated embodiment.

FIG. 10 illustrates another example of an ID tag 1000 for XYZ content provider. In addition to including the identifying text "XYZ" 1002, the ID tag 1000 also includes a background 1004 that may include unwanted or unusable information. For example, in some cases the ID tag 1000 is a collection of individual image layers, typically utilizing various forms of background regions that are used either to blend the ID tag to the current programming content, or to provide the viewer with information about the current programming state (e.g., live or prerecorded). When a multi-layered ID tag is utilized, it has been determined that most combinations of visible layers may utilize a specific image layer that is common to all forms. In these cases, rather than creating visual detection units 702 (FIG. 7) for detecting every combination of ID tag, visual detection units may gain speed, simplicity, and lower administrative overhead by utilizing a masking method.

Masking is a method for providing image-based detection algorithms with data that represent which pixels within the detection region are suitable to use for analysis. For example, FIG. 10 illustrates a detection region 1006 that may be positioned over the text XYZ 1002 of the ID tag 1000. The detection region 1006 includes cut-out regions 1008 shaped as an outline of the text XYZ 1002. The cut-out regions 1008 may be used by one or more detection units 702 (FIG. 7). A region 1010 outside of the cut-out regions 1008 may be ignored by the detection units. Therefore, the background 1004, which may change from time to time, does not affect the detection systems.

Masking is also a powerful technique for dealing with visual elements that have areas of alpha blending or transparency. Alpha blending is the process of combining an image with a background to create the appearance of partial or full transparency. Alpha blending is used extensively when combining computer-rendered image elements with live footage. If an ID tag detection unit 702 operates solely on a pixel comparison basis, the detection unit could utilize the value of alpha channels of the pixels to compensate for the transparency of the pixels.

While ID tags provide an overall consistent indication of the current content type, there are conditions that may benefit from or require the identification and addition of supplemental detection regions which are used to improve the accuracy of a detection unit 702 or detector group 700, or to contribute additional state data to a collective decision tree. The process for determining detection regions to identify usable video elements as discussed above with reference to FIG. 8.

One example of a visual element that may be used independently or in conjunction with ID tags is an information ticker, such as the information ticker 910 shown in FIG. 9. Prominent in news-based programming, information tickers are generally the scrolling text and the background region on which the text is placed. Information tickers are usually only displayed when program content is active, much like ID tags. As an example, an OR-based trigger machine or state transition manager 708 (FIG. 7) may have one of its inputs connected to a detection unit 702 finding ID tags and another input connected to a detection unit finding an information ticker. This configuration may provide a more robust method for determining the start or end of a programming content segment.

As an example, near the end of a programming content segment the ID tag may disappear while the information ticker remains (or vice versa). The OR-based state transition manager discussed above will hold its output in the true state until both of these visual elements have disappeared and both of their respective detection units output a false result.

Another example of a visual element that may be used independently or in conjunction with ID tags is a border boundary. Border boundaries are the edges of nested video content regions associated with and defined by the content itself. These border boundaries are usually visually distinct and are constructed by horizontal or vertical lines to form rectangular segmentation of the video frame. In the example shown in FIG. 9, a border boundary 914 is formed by the horizontal lines that make up a top edge of the information ticker. Much like information tickers and ID tags, border boundaries are usually consistent in their coloring and positional properties. For example, a detection unit 702 or a detector group 700 that implements a visual edge detection algorithm may be used to find the X and Y positional components of the content edge regions, and cross-check each found horizontal line against known edges or content region properties. In the example shown in FIG. 9, the detection region 912d may be used to detect the border boundary 914 located at the top edge of the information ticker 910.

The program title box 908 shown in FIG. 9 may be dynamically presented and therefore unreliable as a visual element source for detecting content state or content state transitions. For example, the program title box 908 may display program title information, newscaster information, location information and the like, that may be changing unpredictably. That is, the variable nature of the program title box's appearance and disappearance timing, as well as the variable random image content within it, may render the program title box an inaccurate source for content type state change notifications. However, this region may be a good candidate for a detection unit 702 that provides informational elements (e.g., metadata). For example, the detection region 912c surrounding the text in the program title box 910 may be used by an informational detection unit 702. With the detection region 912c defined and configured with an appropriate detection mask (FIG. 10), it could be used to accurately fetch predefined metadata properties of the program content. During configuration of visual informational detection units that are used for information extraction only, the output triggering mode may be set to the one-shot type firing mode 710 (FIG. 7). When the detection unit 702 transitions it output state to true, it is an indication that the detection unit has analyzed its detection region(s) and determined the region contains a match to a predefined detection mask. If additional information, such as metadata, is bound to the visual element that has been found as being active, the additional information may be appended to the pre-existing state information that is output by the active detection unit. This accompanying information collection may then be forwarded on to other subsystems, which may also append additional information to the collection, and so on, until the end of the state transition manager decision tree is reached.

Figure 11:
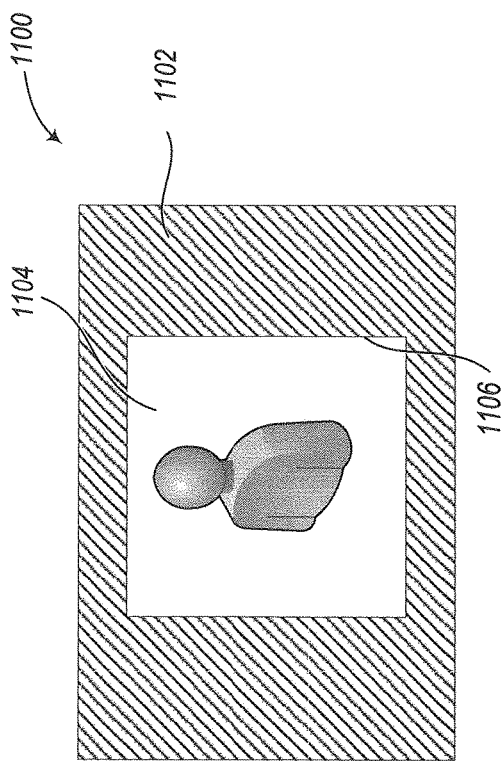
FIG. 11 is a rendered video frame of a mediacast source data flow depicting a black border surrounding a content display area that is smaller than the rendered video frame, the black border usable by a mediacast content detection system to detect a characteristic of one or more video content segments, according to one illustrated embodiment.

Another example of a visual element that may be used independently or in conjunction with ID tags is a black border boundary. FIG. 11 illustrates a video frame 1100 that includes a black border 1102 surrounding a video content display area 1104. A black border edge 1106 is defined between the black border 1102 and the video content display area 1104. Black edge boundaries may be particularly useful if the detection system is providing information to transcoding/rebroadcasting systems.

Black edge boundaries may be useful for determining the aspect ratio of video-based content. For example, the dimensions of the black border edges 1106 may be used to calculate the aspect ratio of the video content, as well as to determine whether any unusual scale factors are in place. It is likely that if the aspect ratio is measured to be a nonstandard value (e.g., not 4:3, 16:9, etc.), the analyzed video content may be scaled in a non-optimal or nonstandard way. This information allows a rebroadcasting system to intelligently compensate for the abnormal scale factors that it may encounter.

As an example, if a detection unit 702 measures a nonstandard aspect ratio (e.g., 5:4), the transcoder/rebroadcast or system may be informed of the standards mismatch condition by attaching the detection unit output to a one-shot type state transition manager that operates to forward the information to the transcoder/rebroadcaster or system. At that point, the transcoder/rebroadcaster or may automatically apply the correct of scaling factors toward the dimensions and error, and present a new video frame which complies with standards dimensional and aspect ratio standards.

Black edge boundaries may also be useful for determining content origination. At present, there is a substantial amount of sub high-definition (HD) content segments, particularly advertisements, being broadcast over HD broadcast channels. These sub HD content segments are typically found to be broadcast at the NTSC horizontal line count of ~480 rather than 1080, for example. Since the quality gap between HD and sub HD video dimension standards is substantial, most of the sub HD content that is broadcast over HD broadcast channels is not scaled. Instead, the sub HD content is centered within the display of the HD broadcast channel and displayed at its lower native resolution. The result is the creation of a fixed ratio amount of black bar edges 1106 that surround the sub HD video content being played.

Since it has been found that much of the sub HD content broadcast over HD broadcast channels relates to local or regional advertisements (e.g., replaceable content), this content origination information may provide valuable data regarding content state when used as a corrective measure, or as one of multiple inputs in a detection system.

Various other visual elements may be used as detection regions to improve the accuracy of a detection unit 702 or detector group 700, or to contribute additional state data to a collective decision tree. Examples of such visual elements include, but are not limited to, a lower third graphic, a chyron graphic, an information ticker graphic, an edge graphic, a score graphic, or text.

Figure 12:
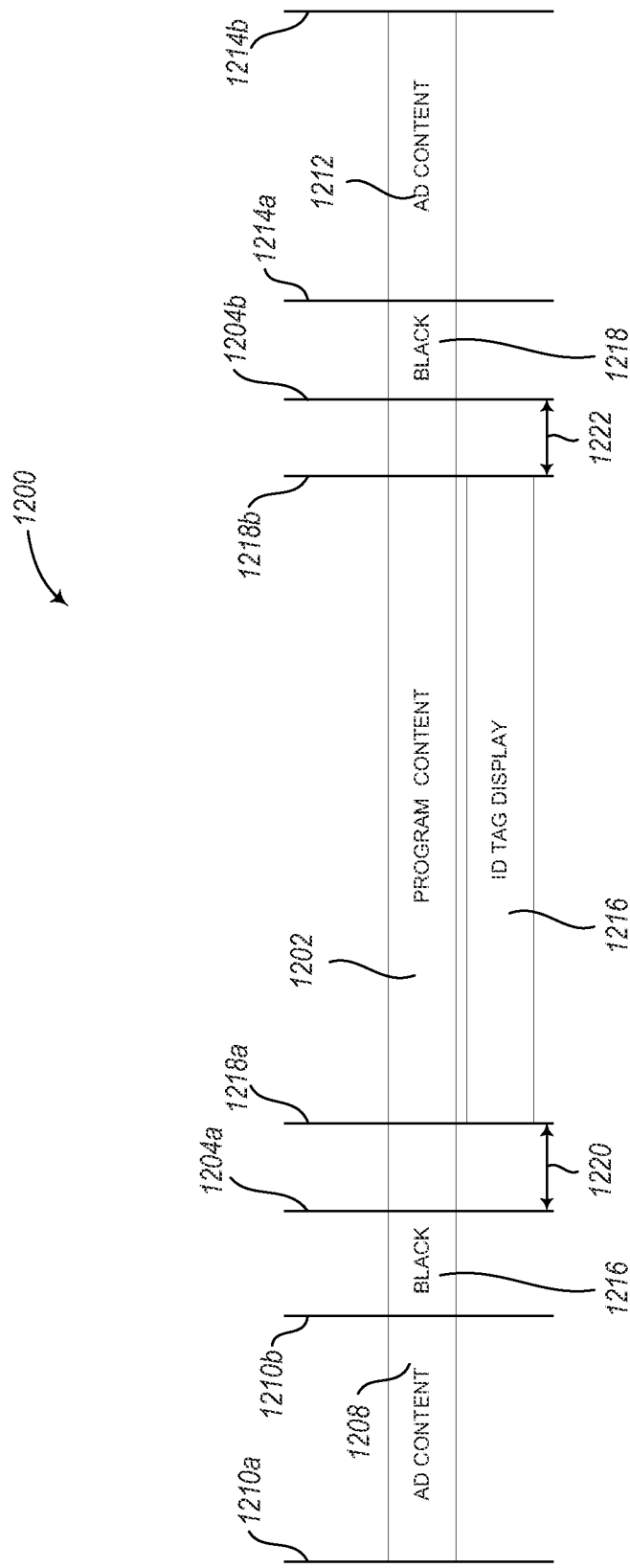
FIG. 12 is a timing diagram illustrating the timing for transitions between replaceable advertising video content segments and a non-replaceable programming video content segment, according to one illustrated embodiment.

FIG. 12 illustrates a timing diagram 1200 for a mediacast source data flow that includes a non-replaceable program content segment 1202 having a start 1204a and an end 1204b. The non-replaceable program content segment 1202 is preceded by a replaceable advertisement content segment 1208 having a start 1210a and an end 1210b. The non-replaceable program content segment 1202 is followed by a replaceable advertisement content segment 1212 having a start 1214a and an end 1214b. Black transition periods 1216 and 1218 are disposed between the non-replaceable program content segment 1202 and each of the replaceable advertisement segments 1208 and 1212. Also shown is a display time 1216 for an ID tag (see FIG. 9) associated with the non-replaceable program content segment 1202 that may be used for detection analysis by the detection systems described herein. The display time 1216 for the ID tag has a start 1218a and an end 1218b.

In this example, the timing information required for content type detection is temporally delayed in relation to the actual transition point. In particular, the start 1204a and end 1204b of the non-replaceable program content segment are different from the start 1218a and end 1218b of the display time 1216 for the ID tag. To compensate for this, the detection system may run with an output delay by buffering the mediacast source data flow. Thus, when the ID tag is displayed and detected at the ID tag display start time 1218a, the detection system may "look backward" in time by an ID tag delay at start period 1220 to search for clues about the start 1204a of the non-replaceable program content segment 1202. Additionally, the detection system may look for a start and an end of the black transition period 1216 to determine the end time 1210b for the replaceable advertising content segment 1208.

As shown in FIG. 12, the ID tag is also removed from display prior to the end of the non-replaceable program content segment 1202. When the detection system detects that the ID tag has been removed at end time 1218b, the system may wait an ID tag delay at end period 1222 before determining the non-replaceable program content segment 1202 has reached its end. In some embodiments, after waiting the ID tag delay at end period 1222, the detection system may also look for the black transition period 1218 to determine the end of the non-replaceable program content segment 1202 and the start of the subsequent replaceable advertisement content segment 1212.

The timing information or markers data may be stored in a nontransitory processor-readable medium (e.g., the non-transitory processor-readable medium 210 of FIG. 2). Utilizing the timing information data and time shifting methods described herein may allow the detection systems to operate on expected patterns, instead of simply discrete elements.

Modifications

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above.

For instance, network and even non-networked topologies other than those illustrated and/or described may be employed. The mediacast generation system may be co-located with the broadcasters or Webcasters or located remotely from the broadcasters or Webcasters, or for example "in the cloud." As noted above, the mediacast generation system may detect replaceable programming or non-programming content segments within the original broadcast or Webcast programming which may directly or indirectly trigger substitution or insertion of new or replacement programming or non-programming content segments to generate the mediacast.

The mediacast generation system may include server computer systems that retrieve the new or replacement programming or new or replacement non-programming content from a variety of different sources. Replacement non-programming content segments may be sourced from an advertiser network server computer system, an advertising network, and/or a third party advertisement aggregator.

In some implementations, replacement programming or non-programming content segments may be inserted or substituted in the programming at a mediacast content consumer device, for example by a media player executing on the mediacast content consumer device. This occurs downstream of the mediacast generation system 116. In contrast, the replacement programming or non-programming content segments may be inserted or substituted in the programming at the mediacast generation system, upstream from the content consumer device. At least some of the implementations described herein may take a server side approach. Taking a server side approach advantageously avoids the need to customize client code for each different mediacast content consumer device, while still providing mediacast capabilities mediacast media players. Depending on the approach taken, a client-side layer could still be added on top of the server-side layer to provide even more level of targeting detail and flexibility.

The implementations described herein can work with all current and future manifest protocols. Examples of current manifest protocols include M3U8 (Apple HLS), ISML (MSFT Smooth), F4M (Adobe "San Jose"). An example of a possible future manifest protocol includes MPEG DASH or other follow on iterations.

The mediacasts described herein may be transmitted or delivered to mediacast content consumers using a number of technologies including, but not limited to, Webcast, terrestrial broadcast, satellite broadcast, cable broadcast, multicast, or unicast.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. To the extent that they are not inconsistent with the specific teachings and definitions herein, U.S. patent application Ser. No. 11/958, 143, published as Publication No. 2008-0120638, U.S. provisional patent application Ser. No. 61/561,186 filed Nov. 17, 201; U.S. provisional patent application Ser. No. 61/587, 475 filed Jan. 17, 2012; and U.S. provisional patent application Ser. No. 61/611,403 filed Mar. 15, 2012 are each incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a content insertion system, the content insertion system comprising at least one processor and at least one nontransitory processor-readable medium communicatively coupled to the at least one processor, the method comprising:
    receiving an electronic mediacast source signal which comprises a plurality of replaceable content segments interspersed with a plurality of non-replaceable content segments, the replaceable content segments including one or more sections of replaceable content material which includes entire frames of image content data, and the non-replaceable content segments including one or more sections of non-replaceable content material which includes entire frames of image content data;
    reviewing only a defined region of a rendering surface of the image content data for a presence or absence of at least one defined graphic element contained within at least one of the replaceable content material or the non-replaceable content material to determine whether a portion of the received electronic mediacast source signal corresponds to a non-replaceable content segment, which comprises one or more sections of non-replaceable content material comprising a plurality of entire frames of image content data that are entirely non-replaceable, or a replaceable content segment, which comprises one or more sections of replaceable content material comprising a plurality of entire frames of image content data that are entirely replaceable, based on at least one of a presence or an absence of the defined graphic element in the defined region of the rendering surface, wherein the defined region is a pre-defined detection region that comprises only a portion of the spatial rendering surface that is smaller than the entire spatial rendering surface, and the defined graphic element is a pre-defined graphic element;
    in response to determining the portion of the received electronic mediacast source signal corresponds to a non-replaceable content segment, retaining the non-replaceable content segment;
    in response to determining the portion of the received electronic mediacast source signal corresponds to a replaceable content segment,
        selecting a replacement content segment from a store of replacement content segments of the content insertion system, the replacement content segment comprising one or more sections of replacement content material, each of the one or more sections of replacement content material comprises a plurality of entire frames of image content data; and
        replacing the one or more sections of the replaceable content material within the replaceable content segment with the one or more sections of replacement content material within the replacement content segment.

2. The method of claim 1 wherein the defined region includes a plurality of pixels, and reviewing at least a defined region of a rendering surface of the image content data comprises ignoring at least some of the plurality of pixels in the defined region.

3. The method of claim 1 wherein reviewing at least a defined region of a rendering surface of the image content data comprises detecting a content provider identifier tag in the at least a defined region of a rendering surface of the image content data.

4. The method of claim 1 wherein reviewing at least a defined region of a rendering surface of the image content data comprises detecting at least one of a lower third graphic, a chyron graphic, an information ticker graphic, an edge graphic, a score graphic, or text in the at least a defined region of a rendering surface of the image content data.

5. The method of claim 1 wherein reviewing at least a defined region of a rendering surface of the image content data comprises reviewing at least a defined region of a rendering surface of the image content data to detect a temporally spaced pattern indicative of at least one of a start of at least one of the content segments or an end of at least one of the content segments.

6. The method of claim 1 wherein reviewing at least a defined region of a rendering surface of the image content data comprises detecting a color intensity of the at least a defined region of a rendering surface of the image content data.

7. The method of claim 6 wherein the one or more sections of replaceable content material and the one or more sections of non-replaceable content material each include audio content data, the method further comprising:
    reviewing at least a portion of the audio content data for a presence or absence of at least one defined auditory content element contained within at least one of the replaceable content material or the non-replaceable content material to determine whether a portion of the received electronic mediacast source signal corresponds to a non-replaceable content segment or a replaceable content segment based on at least one of a presence or an absence of the defined auditory content element.

8. The method of claim 7 wherein reviewing at least a portion of the audio content data comprises reviewing at least a portion of the audio content data for a period of silence, and reviewing at least a defined region of a rendering surface of the image content data comprises detecting a low color intensity.

9. The method of claim 1 wherein reviewing at least a defined region of a rendering surface of the image content data comprises reviewing at least a defined region of a rendering surface of the image content data for a presence or absence of a plurality of defined graphic elements contained within at least one of the replaceable content material or the non-replaceable content material to determine whether a portion of the received electronic mediacast source signal corresponds to a non-replaceable content segment or a replaceable content segment based on at least one of a presence or an absence of the plurality of defined graphic elements, the plurality of defined graphic elements indicative of at least one of a start of at least one of the content segments or an end of at least one of the content segments.

10. The method of claim 1 wherein reviewing at least a defined region of a rendering surface of the image content data comprises detecting a presence or absence of at least one edge in the at least a defined region of a rendering surface of the image content data.

11. The method of claim 1 wherein reviewing at least a defined region of a rendering surface of the image content data comprises detecting a presence or absence of a continuous lower third graphic in the at least a defined region of a rendering surface of the image content data.

12. The method of claim 1 wherein reviewing at least a defined region of a rendering surface of the image content data comprises detecting a presence or absence of a content source provider graphic in a lower third portion of the at least a defined region of a rendering surface of the image content data.

13. The method of claim 1, further comprising:
   verifying whether an identified presence or absence of the defined graphic element occurs during a defined expected time period; and
   determining whether a portion of the received electronic mediacast source signal corresponds to a non-replaceable content segment or a replaceable content segment based on the verification of the identified presence or absence of the defined graphic element.

14. The method of claim 1 wherein reviewing the at least a defined region of a rendering surface of the image content data of the received electronic mediacast source signal for a presence or absence of at least one defined graphic element further comprises:
   determining a start of at least one of the content segments of the electronic mediacast source signal; and
   determining an end of at least one of the content segments of the electronic mediacast source signal.

15. The method of claim 1, further comprising:
   causing delivery of a modified electronic mediacast source signal that comprises the replacement content segment over a network by at least one component of the content insertion system.

16. The method of claim 1 wherein selecting a replacement content segment comprises selecting a replacement content segment based at least in part on at least one of a geographic location of a content consumer, a browsing history of the content consumer, a buying history of the content consumer, or a piece of self-reported information provided by the content consumer.

17. The method of claim 1, further comprising:
   encoding the replacement content segment as content fragments; and
   providing the content fragments to a number of content delivery networks for retrieval of the content fragments by content consumers.

18. The method of claim 1, further comprising:
   reviewing the at least a defined region of a rendering surface of the image content data of the received electronic mediacast source signal for a presence or absence of at least one defined graphic element to determine metadata related to at least one of the replaceable content segments or related to at least one of the non-replaceable content segments.

19. The method of claim 18 wherein reviewing the at least a defined region of a rendering surface of the image content data of the received electronic mediacast source signal for a presence or absence of at least one defined graphic element to determine metadata comprises detecting a title associated with at least one of the replaceable content segments or the non-replaceable content segments.

20. The method of claim 1 wherein receiving an electronic mediacast source signal comprises receiving an electronic mediacast source signal which comprises a plurality of non-replaceable programming content segments interspersed with a plurality of replaceable advertising content segments.

21. A content delivery system, comprising:
   at least one communications port communicatively coupleable to receive an electronic mediacast source signal from a broadcaster or a Webcaster, the electronic mediacast source signal at least including a plurality of replaceable content segments comprising image content data and a plurality of non-replaceable content segments comprising image content data;
   at least one nontransitory processor-readable medium which stores a number of processor-executable instructions; and
   at least one processor communicatively coupled to the at least one communications port and communicatively coupled to the at least one nontransitory processor-readable medium to execute the processor-executable instructions, which execution causes the at least one processor to:
   receive the electronic mediacast source signal from the broadcaster or the Webcaster;
   for each of a number of the content segments of the electronic mediacast source signal, detect whether the respective content is non-replaceable or replaceable, whereby the at least one processor:
      reviews only a defined region of a rendering surface of the image content data for a presence or absence of at least one defined graphic element contained within at least one of the replaceable content segments or the non-replaceable content segments to determine whether a portion of the received electronic mediacast source signal corresponds to a non-replaceable content segment, which comprises one or more sections of non-replaceable content material comprising a plurality of entire frames of image content data that are entirely non-replaceable, or a replaceable content segment, which comprises one or more sections of replaceable content material comprising a plurality of entire frames of image content data that are entirely replaceable, based on at least one of a presence or an absence of the defined graphic element, wherein the defined region is a pre-defined detection region that comprises only a portion of the spatial rendering surface that is smaller than the entire spatial rendering surface, and the defined graphic element is a pre-defined graphic element;
   retains content segments of the received electronic mediacast source signal identified as being non-replaceable content segments; and
   replaces one or more sections of the replaceable content material within each of at least some of the content segments of the received electronic mediacast source signal identified as being replaceable with a respective one or more sections of replacement content material within at least one replacement content segment, wherein the one or more sections of the replacement content material has a duration that is one of greater than or less than a duration of the one or more sections of the replaceable content material replaced by the replacement content material.

* * * * *